United States Patent
Takekawa

(10) Patent No.: US 8,580,442 B2
(45) Date of Patent: Nov. 12, 2013

(54) FUEL CELL SYSTEM AND METHOD OF REPAIRING ELECTROLYTE MEMBRANE THEREOF

(75) Inventor: Toshihiro Takekawa, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 844 days.

(21) Appl. No.: 12/063,204

(22) PCT Filed: Jul. 26, 2006

(86) PCT No.: PCT/JP2006/314765
§ 371 (c)(1),
(2), (4) Date: Feb. 7, 2008

(87) PCT Pub. No.: WO2007/018035
PCT Pub. Date: Feb. 15, 2007

(65) Prior Publication Data
US 2009/0226773 A1    Sep. 10, 2009

(30) Foreign Application Priority Data
Aug. 9, 2005 (JP) .................................. 2005-230304

(51) Int. Cl.
*H01M 8/06* (2006.01)
*H01M 8/18* (2006.01)

(52) U.S. Cl.
USPC .......................................... 429/409; 429/419

(58) Field of Classification Search
USPC ......... 429/409, 419, 427, 430, 431, 433, 442, 429/453, 450, 472, 475
IPC ...................................... H01M 8/02,8/04, 8/10
See application file for complete search history.

(56) References Cited

U.S. PATENT DOCUMENTS

| 5,273,694 | A |   | 12/1993 | Perusich et al. |
|---|---|---|---|---|
| 5,356,663 | A |   | 10/1994 | Perusich et al. |
| 6,025,457 | A | * | 2/2000 | Ohno et al. ................... 528/170 |
| 6,852,138 | B1 | * | 2/2005 | Topsoe et al. ................ 29/623.1 |
| 2002/0187890 | A1 | * | 12/2002 | Naka et al. ....................... 502/38 |
| 2004/0146785 | A1 | * | 7/2004 | Mizutani et al. .............. 429/303 |
| 2004/0224203 | A1 |   | 11/2004 | Bhamidipati et al. |
| 2005/0064252 | A1 | * | 3/2005 | Kusakabe et al. ............... 429/13 |
| 2005/0130001 | A1 | * | 6/2005 | Yasumoto et al. .............. 429/22 |
| 2006/0234097 | A1 |   | 10/2006 | Boehm et al. |

FOREIGN PATENT DOCUMENTS

| JP | 3-40378 A | 2/1991 |
|---|---|---|
| JP | 6-192447 A | 7/1994 |
| JP | 9-27336 A | 1/1997 |
| JP | 2002-298890 A | 10/2002 |
| JP | 2004-214089 A | 7/2004 |

(Continued)

*Primary Examiner* — Ula C Ruddock
*Assistant Examiner* — Daniel Gatewood
(74) *Attorney, Agent, or Firm* — Foley & Lardner LLP

(57) ABSTRACT

A fuel cell system of the present invention includes: a fuel cell stack (1) composed by stacking a plurality of single cells, each single cell having: a membrane electrode assembly in which electrode catalyst layers (3) and gas diffusion layers (4) are disposed on both surfaces of an electrolyte membrane (2) formed of a gel electrolyte with a sol-gel phase transition temperature; and separators (5) disposed on both sides of the membrane electrode assembly; and a temperature adjusting apparatus (12) which adjusts a temperature of the electrolyte membrane in the single cell. In such a way, a defect such as a pinhole that has occurred in the electrolyte membrane (2) can be solved.

27 Claims, 19 Drawing Sheets

(56) References Cited

FOREIGN PATENT DOCUMENTS

| | | | |
|---|---|---|---|
| JP | 2004-355959 A | | 12/2004 |
| JP | 2004355959 A | * | 12/2004 |
| JP | 2005-26150 A | | 1/2005 |
| JP | 2005-44658 A | | 2/2005 |
| JP | 2005-71819 A | | 3/2005 |
| JP | 2005071819 A | * | 3/2005 |
| WO | WO 2004/082813 A2 | | 9/2004 |

* cited by examiner

ANODE (FUEL ELECTRODE)      CATHODE (OXIDANT ELECTRODE)

FUEL CELL SYSTEM AND METHOD OF REPAIRING ELECTROLYTE MEMBRANE THEREOF

TECHNICAL FIELD

The present invention relates to a fuel cell using, as an electrolyte membrane, a gel electrolyte having a sol-gel phase transition temperature. Specifically, the present invention relates to a fuel cell system capable of repairing a pinhole that may occur in the electrolyte membrane, cause a deterioration of cell performance, and be a cause of cross leakage, and relates to a method of repairing an electrolyte membrane, which can repair the electrolyte membrane deteriorated owing to the occurrence of the pinhole.

BACKGROUND ART

In a fuel cell stack, a pinhole sometimes occurs in an electrolyte membrane of each cell. The occurrence of the pinhole leads to a cross leakage of gas, and largely affects performance and lifetime of a fuel cell. Therefore, when such gas leakage occurs as a result of detecting whether or not the gas leaks in the electrolyte membrane, it is desirable to adopt an appropriate measure immediately.

As a detection apparatus of the gas leakage in the fuel cell stack as described above, there is an apparatus described in Japanese Patent Unexamined Publication No. H03-40378. Moreover, as a detection method of the gas leakage in the fuel cell stack, there are methods described in Japanese Patent Unexamined Publication No. 2002-298890 and Japanese Patent Unexamined Publication No. H09-27336.

DISCLOSURE OF INVENTION

However, in general, it is difficult to detect the gas leakage of each cell stacked as a constituent of the fuel cell stack. Moreover, the conventional technologies have required additional equipment for the detection, and have had problems in detection limitations and detection accuracy. Furthermore, in the conventional technologies, even if the cell that causes the gas leakage can be specified, a measure that can be adopted is only to detach the cell or to electrically bypass the cell. Therefore, unless the cell in which the gas leakage occurs is completely replaced, a decrease of the power generation performance of the fuel cell system cannot be avoided.

The present invention has been made in order to solve the above-described problems. It is an object of the present invention to provide a fuel cell system that, even if the pinhole causing the cross leakage of the gas occurs in the electrolyte membrane, capable of repairing the electrolyte membrane in a state as it is and recovering the power generation performance without disassembling the fuel cell stack, and to provide a method of repairing an electrolyte membrane, which is capable of rebuilding the electrolyte membrane deteriorated owing to the occurrence of the pinhole.

A fuel cell system according to a first aspect of the present invention comprises: a fuel cell stack composed by stacking a plurality of single cells, each single cell comprising: a membrane electrode assembly in which electrode catalyst layers and gas diffusion layers are disposed on both surfaces of an electrolyte membrane formed of a gel electrolyte having a sol-gel phase transition temperature; and separators disposed on both sides of the membrane electrode assembly; and a temperature adjustment apparatus which adjusts a temperature of the electrolyte membrane in the single cell.

A method of repairing an electrolyte membrane according to a second aspect of the present invention is a method of repairing an electrolyte membrane formed of a gel electrolyte having a sol-gel phase transition temperature in a fuel cell system including a fuel cell stack composed of single cells, each single cell including the electrolyte membrane, the method comprising: predicting or detecting an occurrence of a pinhole in the electrolyte membrane; stopping an operation of the fuel cell stack when the occurrence of the pinhole is predicted or detected; heating the electrolyte membrane and solating the gel electrolyte after the operation of the fuel cell stack is stopped; and dropping a temperature of the electrolyte membrane and gelating the gel electrolyte after the gel electrolyte is solated and the pinhole is solved.

BEST MODE FOR CARRYING OUT THE INVENTION

Figure 1:
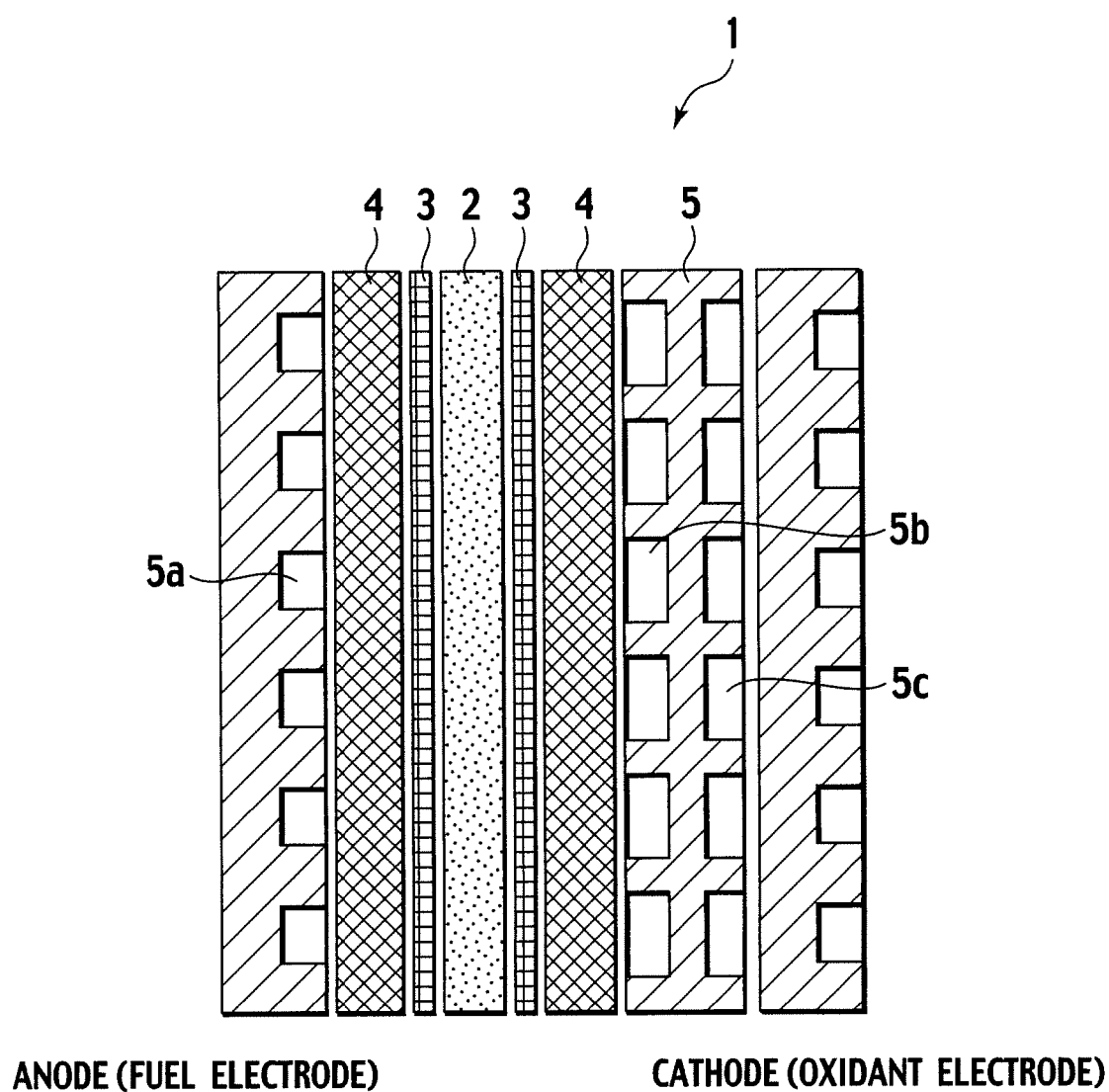
FIG. 1 is a schematic cross-sectional view showing a cell structure of a fuel cell stack for use in a fuel cell system of the present invention.

A description will be made below in detail of embodiments regarding a fuel cell system of the present invention and a method of repairing an electrolyte membrane in the fuel cell system based on the drawings.

The fuel cell system of the present invention includes: a fuel cell stack 1 having cells, each of which uses an electrolyte membrane 2 made of a gel electrolyte; and a temperature adjustment apparatus 12 that adjusts a temperature of the above-described fuel cell stack or cell. Moreover, according to needs, the fuel cell system of the present invention includes: a pinhole detection apparatus 13 provided with a variety of probes for detecting a pinhole; a power generation controller 15 that controls the cell; and further an operation control apparatus 14 that controls the entirety of the system and is coupled to the pinhole detection apparatus 13, the temperature adjustment apparatus 12 and the power generation controller 15 through a signal circuit.

In FIG. 1, a cell structure example in the fuel cell stack 1 for use in the fuel cell system of the present invention is shown. In the cell in the present invention, a membrane electrode assembly (MEA) is formed of: the electrolyte membrane 2 made of the gel electrolyte having a sol-gel phase transition temperature; two electrode catalyst layers 3 (fuel electrode and oxidant electrode) and two gas diffusion layers (GDLs) 4, both of which are disposed on both surfaces of the electrolyte membrane 2 so as to sandwich the electrolyte membrane 2 therebetween. Then, further on both sides of the membrane electrode assembly, there are disposed separators 5 which include: a fuel gas passage 5a; an oxidant gas passage 5b; and a coolant passage 5c, and form partition walls between the cells. The cell (single cell) is composed of the membrane electrode assembly and the separators 5, and the fuel cell stack 1 is composed by stacking these single cells. Moreover, fuel gas containing hydrogen, oxidant gas containing oxygen, and further a variety of cooling waters are sealed by a sealing material along outer edge portions of the separators 5.

The two electrode catalyst layers 3 disposed on both surfaces of the electrolyte membrane 2 are formed of electrode catalyst in which platinum or platinum and other metals are supported on carbon microparticles represented by carbon black and the like. Moreover, on side surfaces of the electrode catalyst layers 3, the gas diffusion layers 4 formed of a porous material are disposed. The gas diffusion layers 4 are made of carbon cloth or carbon paper. Catalyst surfaces in the electrode catalyst layers 3 contact the electrolyte membrane 2, and opposite surfaces thereto contact the gas diffusion layers 4.

The separators 5 are composed of a gas-impermeable dense carbon material. On one surface or both surfaces of each separator 5, a large number of grooves are formed in order to ensure the fuel gas passage 5a, the oxidant gas passage 5b or the coolant passage 5c. Then, the fuel gas and the oxidant gas are adapted to be supplied from the respective gas inlets thereof through the passages 5a and 5b to each cell of the fuel cell stack, and to be discharged from gas outlets.

In the separator in the oxidant electrode, the coolant passage 5c for exhausting heat generated from the fuel cell itself is provided. It is not always necessary that the coolant passages 5c be placed for each of the cells; however, it is desirable that the coolant passages 5c be disposed as many as possible since an amount of heat to be removed from the fuel cell is increased when an output is increased.

Moreover, in the separators 5, in regions where the cooling water as coolants circulate, sealing portions which prevent leakage of the cooling water are formed. Note that, in FIG. 1, an example is shown, where a cooling water channel is formed on a back surface on the cathode electrode side; however, such a channel-formed region is not limited to the back surface of the cathode electrode, and the cooling water channel may be formed on a back surface of the anode electrode, or may be formed on the separators of both of the electrodes.

As will be described later, the present invention is one to enable recovery from the pinhole occurring in the electrolyte membrane in such a manner that the electrolyte membrane of the fuel cell stack is heated to be then solated. Accordingly, it is preferable that the electrolyte membrane 2 be made of the gel electrolyte. Then, as the gel electrolyte, one is preferable, which has the sol-gel phase transition temperature, and desirably, a phase transition temperature of approximately 120 to 200° C. as will be described later. Specifically, as the electrolyte membrane 2, one can be used, which is formed of: a three-dimensional mesh structure that is formed of a fiber-like aggregate with a nanometer size and has the sol-gel phase transition temperature; and an electrolyte made of cation and anion components covered with such a structure.

Figure 2:
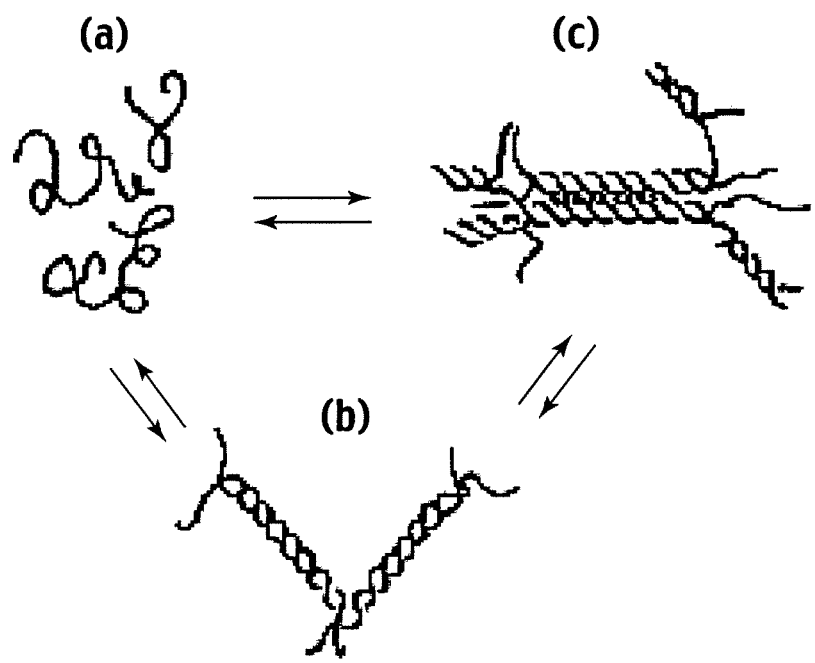
FIG. 2 is schematic views showing an example of a three-dimensional mesh structure composing a gel electrolyte for use in an electrolyte membrane of the fuel cell stack.
Figure 3:
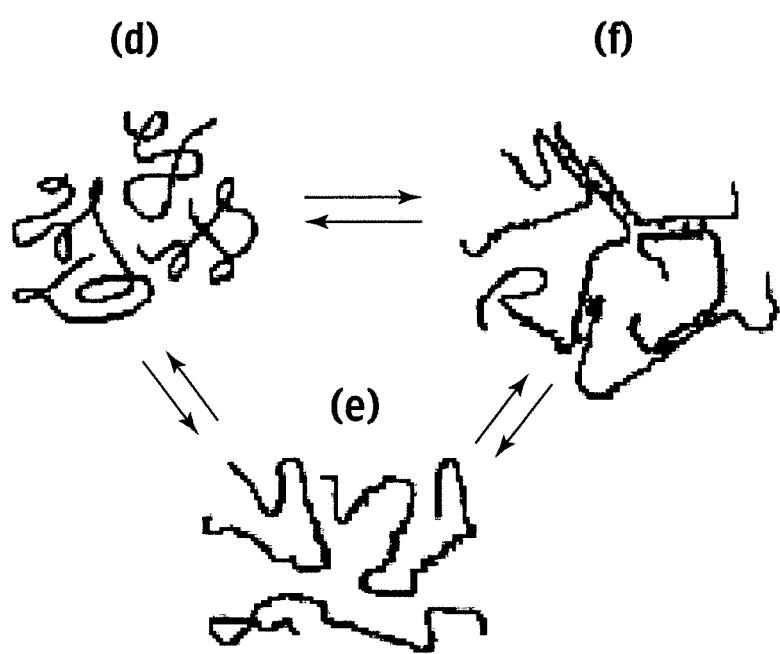
FIG. 3 is schematic views showing another example of the three-dimensional mesh structure.

Here, it is preferable that, in the above-described three dimensional mesh structure, unit constituents be associated (aggregated) with one another to form the fiber-like aggregate with a nanometer size (approximately 1 to 30 nm). For example, in carrageenan represented by polysaccharide, as shown in FIG. 2 and FIG. 3, ones are mentioned, in which the unit constituents create double helixes (b) and then become an aggregate (c), and in which the unit constituents create single spirals (e) and then become an aggregate (f). Note that FIGS. 2(a) to 2(c) show random coils, the double helixes, and a state where the double helixes are aggregated, respectively, and FIGS. 3(d) to 3(f) show random coils, the single spirals, and a state where the single spirals are aggregated, respectively.

Moreover, it is known that compounds of diamide derivatives, L-isoleucine derivatives and L-valine derivatives of 1,2-hydroxystearic acid and trans-1,2-diaminocyclohexane, and the like, which are put into practical use as a solidifying agent of waste deep-frying oil, gelate a wide range of solvents and oils. Then, in such gelation, molecules are self-aggregated through noncovalent bonding such as hydrogen bonding and Van der Waals force, which act between the molecules, and then the fiber-like aggregate is formed.

These illustrated aggregates finally form the three-dimensional mesh structures, whereby solvent molecules are captured into the mesh structure, thus making it possible to form gel.

As described above, the unit constituents act as a gelatinizer. Accordingly, if a blending degree of the unit constituents is adjusted, then a gel electrolyte with a desired viscosity (hardness) can be prepared regardless of a viscosity of the electrolyte. Specifically, even a liquid electrolyte can be gelated only by a simple operation of mixing and dissolving the unit constituents. Note that, the unit constituents can be used in the proportion of about 1-400 g to 1 L of the gel electrolyte. Further, suitably, the above-described unit constituents are low-molecule gelatinizers with a molecular weight of 1000 or less. At this time, it becomes easier to handle the unit constituents. Moreover, as the low-molecule gelatinizers, more homogeneous and higher-purity materials are available in comparison with polymers. Furthermore, the electrolyte is covered with the three-dimensional mesh structure that is in an associated state of the low-molecule gelatinizers, and accordingly, a decrease of ion conductivity, which follows that the electrolyte is kept, can be suppressed. Specifically, in the case of a gel electrolyte formed of a polymer and a crosslink accompanied with a chemical reaction, the electrolyte itself is strongly held by the polymer, and accordingly, there is an apprehension that a self-diffusion coefficient of the electrolyte itself may be decreased, whereby the ion conductivity of the electrolyte membrane may be decreased. However, in the case of the gel electrolyte formed of the low-molecule gelatinizer, the electrolyte itself is loosely held by the above-described three-dimensional mesh structure, and accordingly, the decrease of the self-diffusion coefficient of the electrolyte itself can be prevented, whereby the decrease of the ion conductivity of the electrolyte membrane can be suppressed.

The above-described unit constituents are not particularly limited as long as they form the three-dimensional mesh structure. As the unit constituents, there are mentioned a polysaccharide type such as κ-carrageenan and agarose, a cyclic dipeptide derivative type (cyclo(L-Asp(OR)-L-Phe)), and the like as shown in the following Chemical formulas 1 to 3.

[Chem. 1]

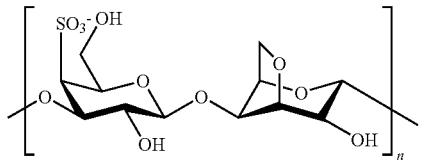

[Chem. 2]

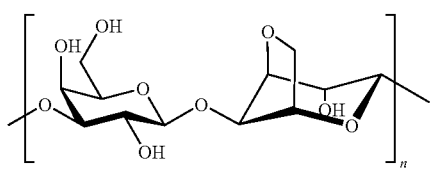

[Chem 3.]

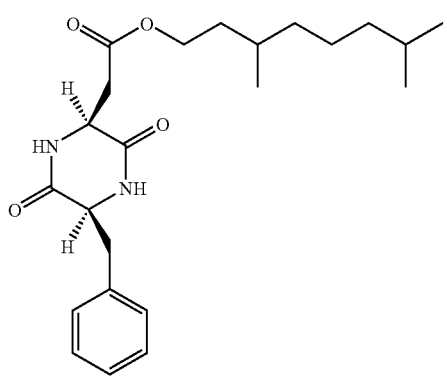

Note that the unit constituent shown in Chemical formula 3 can by synthesized from an L-phenylene alanine compound (L-aspartyl-L-phenylalanine methyl ester) as shown in the following Chemical formula 4.

[Chem. 4]

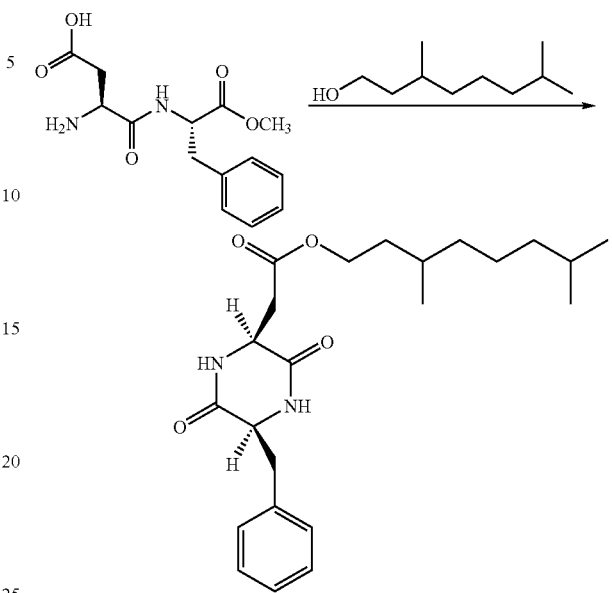

In the above-described unit constituents, materials thereof are versatile and easily available, and the gelation thereof is comparatively easy. Moreover, it is easy to handle the unit constituents. Furthermore, even room-temperature molten salt (ionic liquid) as will be described later can be easily gelated. Note that the unit constituents are not particularly limited as long as they are materials having the above-described characteristics, and even polymers can be used.

As described above, the gel electrolyte causes a reversible sol-gel phase change at a predetermined temperature (phase transition temperature) as a threshold. In other words, the above-described gel electrolyte is liquefied by being heated, and is cooled after being coated or poured into a mold, and is thereby congealed (gelated). Therefore, it is extremely easy for the gel electrolyte to mold the electrolyte membrane. It becomes possible to handle the above-described gel electrolyte in a sol state for a variety of processes such as a screen printing method, a doctor blade method and a decal method, and the gel electrolyte can be molded into a desired shape by a simple operation (cooling).

The electrolyte covered with the three-dimensional mesh structure formed of the fiber-like aggregate is one composed of the cation component and the anion component, and preferably, these include any one or both of a molecular cation and a molecular anion. As the electrolyte, an atomic one (typically, NaCl and the like) is also mentioned; however, when the electrolyte is as it is, combinations which form the liquid electrolyte are poor. Accordingly, a configuration of the electrolyte membrane is sometimes limited. Moreover, the atomic electrolyte is formed into an aqueous solution, and thereby can be formed into an electrolytic solution (electrolysis solution); however, the electrolysis solution formed of the aqueous solution is affected by such a state change that water as a solvent is dried, and accordingly, it is difficult to constantly maintain properties of the electrolyte.

More preferably, the above-described electrolyte is room-temperature molten salt (ionic liquid) composed of the molecular cation and the molecular anion. In such a way, a procedure of dissolving the electrolyte can be omitted, and a structure forming process can be simplified. Moreover, characteristics of the room-temperature molten salt, and specifically, such characteristics that a vapor pressure thereof is extremely low and the salt is less likely to be vaporized, that the salt is fire-resistant, that the salt has a high thermal decomposition temperature (>250 to 400° C.), and that the salt has a low freezing point (<−20° C.) are advantageous as the electrolyte for the fuel cell. Note that the "molecular cation" and the "molecular anion" stand for a polyatomic cation and a polyatomic anion, respectively.

A description will be made below of specific examples of the cation component and the anion component, which compose the above-described electrolyte. As the cation component, there are mentioned: imidazolium derivatives, 1 to 3 substitutes, which are shown in the following Chemical formulas 5 to 7; pyridinium derivatives shown in Chemical formula 8; pyrrolidinium derivatives shown in Chemical formula 9; ammonium derivatives shown in Chemical formula 10; phosphonium derivatives shown in Chemical formula 11; guanidinium derivatives shown in Chemical formula 12; isouronium derivatives shown in Chemical formula 13; thiourea derivatives shown in Chemical formula 14; and the like.

[Chem. 5]

R in the above formula represents an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Among them, in particular, one can be suitably used, in which R is a methyl group, an ethyl group, a propyl group, an isopropyl group, or a butyl group.

[Chem. 6]

$R^1$ and $R^2$ in the above formula represent an alkyl group, an alkenyl group, an alkynyl group, a cycloalkyl group, an aryl group, an aralkyl group, an acyl group, an alkoxyalkyl group, or a heterocyclic group, in which a carbon number for at least one R is 1 to 18. Among them, in particular, one can be suitably used, in which R is hydrogen, a methyl group, an ethyl group, a propyl group, an isopropyl group, a butyl group, a pentyl group, a nonyl group, a hexyl group, an octyl group, a decyl group, a tetradecyl group, an octadecyl group, or a benzyl group.

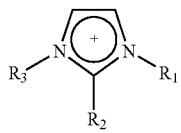

[Chem. 7]

$R^1$, $R^2$ and $R^3$ in the above formula represent hydrogen, or an alkyl group, an alkenyl group, an alkynyl group, a cycloalkyl group, an aryl group, an aralkyl group, an acyl group, an alkoxyalkyl group, or a heterocyclic group, of which hydrogen and carbon numbers are 1 to 18. Among them, in particular, one can be suitably used, in which $R^1$ and $R^2$ are methyl groups, and $R^3$ is hydrogen, a methyl group, an ethyl group, a propyl group, a butyl group, or a hexyl group.

Note that, in the imidazolium rings written in the above-described Chemical formula 5 to Chemical formula 7, it is also possible to introduce the alkyl group into any one of the fourth order and the fifth order or both thereof. Also in this case, one can be suitably used from among an alkyl group, an alkenyl group, an alkynyl group, a cycloalkyl group, an aryl group, an aralkyl group, an acyl group, an alkoxyalkyl group, and a heterocyclic group, of which carbon number is 1 to 18.

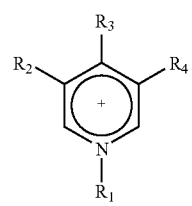

[Chem. 8]

$R^1$ in the above formula represents an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Moreover, with regard to $R^2$, $R^3$ and $R^4$, at least one thereof is hydrogen (H), and each of the others thereof represent an alkyl group, an alkenyl group, an alkynyl group, a cycloalkyl group, an aryl group, an aralkyl group, an acyl group, an alkoxyalkyl group, or a heterocyclic group, of which carbon number is 1 to 18. In particular, ones can be suitably used, in which $R^1$ is an ethyl group, a butyl group, a hexyl group, or an octyl group, and all of $R^2$, $R^3$ and $R^4$ are hydrogen, and in which one or two thereof are methyl groups.

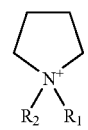

[Chem. 9]

At least one or more of $R^1$ and $R^2$ in the above formula represents an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Among them, in particular, one can be suitably used, in which each of $R^1$ and $R^2$ represents a methyl group, an ethyl group, a propyl group, a butyl group, a hexyl group, or an octyl group. Moreover, even if one of R is hydrogen, such a cation component can be suitably used.

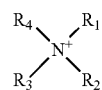

[Chem. 10]

Each of $R^1$, $R^2$, $R^3$ and $R^4$ represents an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Among them, in particular, ones can be suitably used, in which all of $R^1$, $R^2$, $R^3$ and $R^4$ are methyl groups or butyl groups, and further, in which at least one or two functional groups are ethyl groups, butyl groups, or methoxyethyl groups.

[Chem. 11]

Each of $R^1$, $R^2$, $R^3$ and $R^4$ represents an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Among them, in particular, ones can be suitably used, in which all of $R^1$, $R^2$, $R^3$ and $R^4$ are butyl groups, and in which a hexyl group and at least one or more tetradecyl groups are provided.

[Chem. 12]

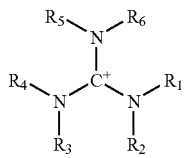

Each of $R^1$, $R^2$, $R^3$, $R^4$, $R^5$ and $R^6$ represents hydrogen, or an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Among them, in particular, ones can be suitably used, in which all of $R^1$, $R^2$, $R^3$, $R^4$, $R^5$ and $R^6$ are hydrogen, and in which any one of $R^1$, $R^2$, $R^3$, $R^4$, $R^5$ and $R^6$ is a methyl group, an isopropyl group, or a phenyl group.

[Chem. 13]

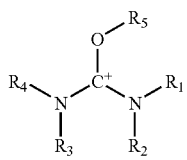

Each of $R^1$, $R^2$, $R^3$, $R^4$ and $R^5$ represents hydrogen, or an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Among them, in particular, ones can be suitably used, in which all of $R^1$, $R^2$, $R^3$, $R^4$ and $R^5$ are methyl groups, and in which $R^1$, $R^2$, $R^3$ and $R^4$ are methyl groups, and $R^5$ is an ethyl group.

[Chem. 14]

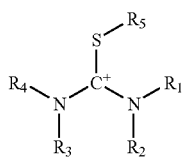

Each of $R^1$, $R^2$, $R^3$, $R^4$ and $R^5$ represents hydrogen, or an alkyl group, an alkenyl group, an alkynyl group, a cycloalkyl group, an aryl group, an aralkyl group, an acyl group, an alkoxyalkyl group, or a heterocyclic group, of which carbon number is 1 to 18. Among them, in particular, one can be suitably used, in which $R^1$, $R^2$, $R^3$ and $R^4$ are methyl groups, and $R^5$ is an ethyl group.

Meanwhile, as the anion component, for example, there are mentioned: halogenides shown in the following Chemical formula 15; sulfates and sulfonates shown in Chemical formulas 16 and 17; amides and imides shown in Chemical formula 18; methanes shown in chemical formula 19; borates shown in chemical formulas 20 to 25; phosphates and antimonates shown in Chemical formulas 26 and 27; and other salts shown in FIG. 28; and the like.

[Chem. 15]

Cl⁻  Br⁻  I⁻

[Chem. 16]

$HSO_4^-$  $CH_3SO_4^-$  $CF_3SO_3^-$  $C_2H_5SO_4^-$  $C_6H_{13}SO_4^-$  $C_4H_9SO_4^-$
$C_8H_{17}SO_4^-$

[Chem. 17]

[Chem. 18]

$(CN)_2N^-$  $[N(CF_3)_2]^-$  $[N(SO_2CF_3)_2]^-$

[Chem. 19]

$[HC(SO_2CF_3)_2]^-$  $C(SO_2CF_3)_3^-$

[Chem. 20]

$BF_4^-$  $B(CN)_4^-$

[Chem. 21]

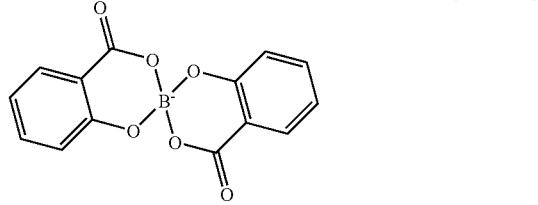

[Chem. 22]

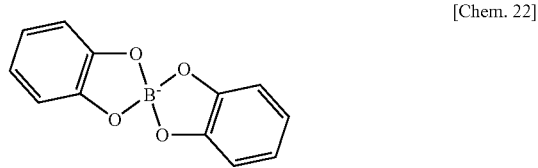

[Chem. 23]

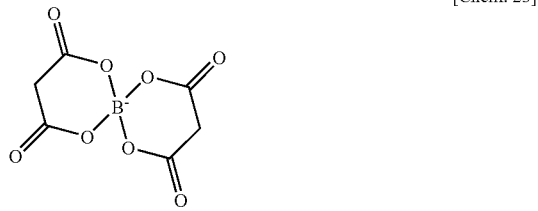

[Chem. 24]

-continued

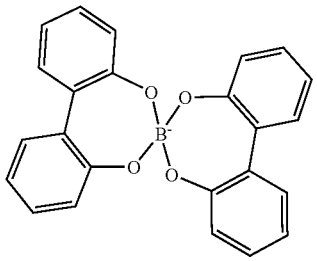
[Chem. 25]

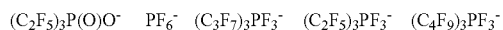
[Chem. 26]

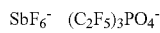

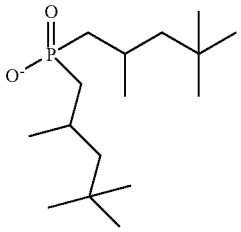
[Chem. 27]

[Chem. 28]

Moreover, as a polyvalent anion, for example, ones shown in the following Chemical formula 29, and the like can be suitably used.

[Chem. 29]

Note that not only each of the above-described cation components and anion components can be used singly, but also two or more thereof can be appropriately combined for use.

Moreover, it is preferable that, in the above-described gel electrolyte, protons be used as carrier ions. In such a way, the electrolyte can be suitably used in the electrolyte membrane 2. Note that, as carrier ions other than the protons, the cation component, and other positive ions can be used.

Moreover, the sol-gel phase transition temperature of the gel electrolyte for use in the present invention is preferably 120° C. or more to 200° C. or less, more preferably, 150° C. or more to 180° C. or less. Specifically, a polymer electrolyte fuel cell (PEFC) is operated at a working temperature of 100° C. or less, and accordingly, the sol-gel phase transition temperature is set at 120° C. or more to 200° C. or less, thus making it possible to repair the electrolyte layer by using this sol-gel phase transition. Then, considering enabling the operation of the fuel cell up to 120° C., it is more preferable to set the sol-gel phase transition temperature at 150° C. or more. Moreover, considering reducing energy required in the case of heating the stack to a high temperature, it is preferable to set such an upper limit of the sol-gel phase transition temperature at 180° C. Note that the sol-gel phase transition temperature can be adjusted by a blended amount of the unit constituents which act as the gelatinizer and form the three-dimensional mesh structure.

Figure 4:
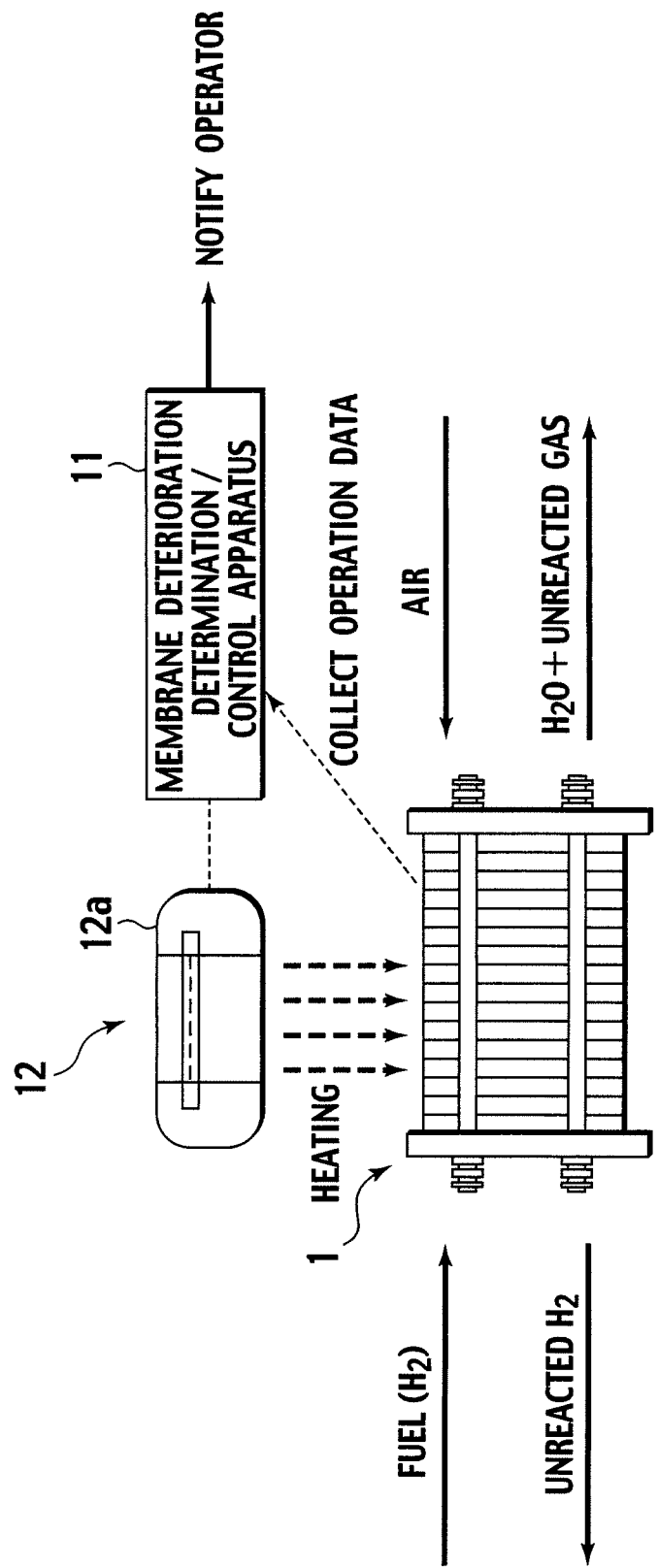
FIG. 4 is a block diagram showing an embodiment of the fuel cell system of the present invention.

FIG. 4 shows an embodiment of the fuel cell system according to the present invention. In the fuel cell system shown in the drawing, the fuel cell stack 1 is composed by stacking a large number of the unit cells as shown in FIG. 1. Each of the unit cells is composed in such a manner that the fuel electrode (electrode catalyst layer 3) is disposed on one surface of the electrolyte membrane 2, the oxidant electrode (electrode catalyst layer 3) is disposed on the other surface, and the separators 5 are provided on the surfaces of the fuel electrode and the oxidant electrode, which are located on the opposite sides to the electrolyte. Each of the unit cells composing the fuel cell stack 1 is allowed to generate power in such a manner that the fuel gas and the oxidant gas (oxygen and air) are supplied to the anode and the cathode, respectively.

The system shown in FIG. 4 includes: a membrane deterioration determination/control apparatus (operation control apparatus) 11 of the membrane electrode assembly; and a heater 12a as the temperature adjustment apparatus 12 of the unit cells and the fuel cell stack 1, which operates in conjunction with the operation control apparatus 11. The membrane deterioration determination/control apparatus 11 performs a diagnosis to predict a state of the cells. Specifically, the membrane deterioration determination/control apparatus 11 assumes a time when the pinhole is assumed to occur in the electrolyte membrane 2, and then starts a repair program of the electrolyte membranes 2 before that time. The temperature adjustment apparatus 12 receives a signal from the membrane deterioration determination/control apparatus 11, and heats the electrolyte membranes of the fuel cell stack. In such a way, the electrolyte membranes are repaired, and accordingly, the performance of the electrolyte membranes is enabled to be maintained at a constant level, and to be managed, and an operable time of the fuel cell can be extended.

A characteristic point of the system is in that it is not detected whether or not the pinhole has occurred in each of the electrolyte membranes 2, but the occurrence of the pinhole is predicted based on deterioration factor information of the fuel cell, which is acquired in advance, even if the pinhole does not occur, and then the repair program of the electrolyte membrane 2 is executed before the pinhole occurs. In this case, criteria by which the repair program is determined to be executed, that is, the information for predicting the deterioration of the electrolyte membrane 2 can be appropriately selected from an accumulated time of the elapse of the operation, the number of starts/stops, the accumulated number of started days from a started date of the fuel cell operation, periodical execution (every one month, every three months, and the like), an accumulated value of times during which the fuel cell stack is exposed to a predetermined temperature or more, and the like.

Figure 5:
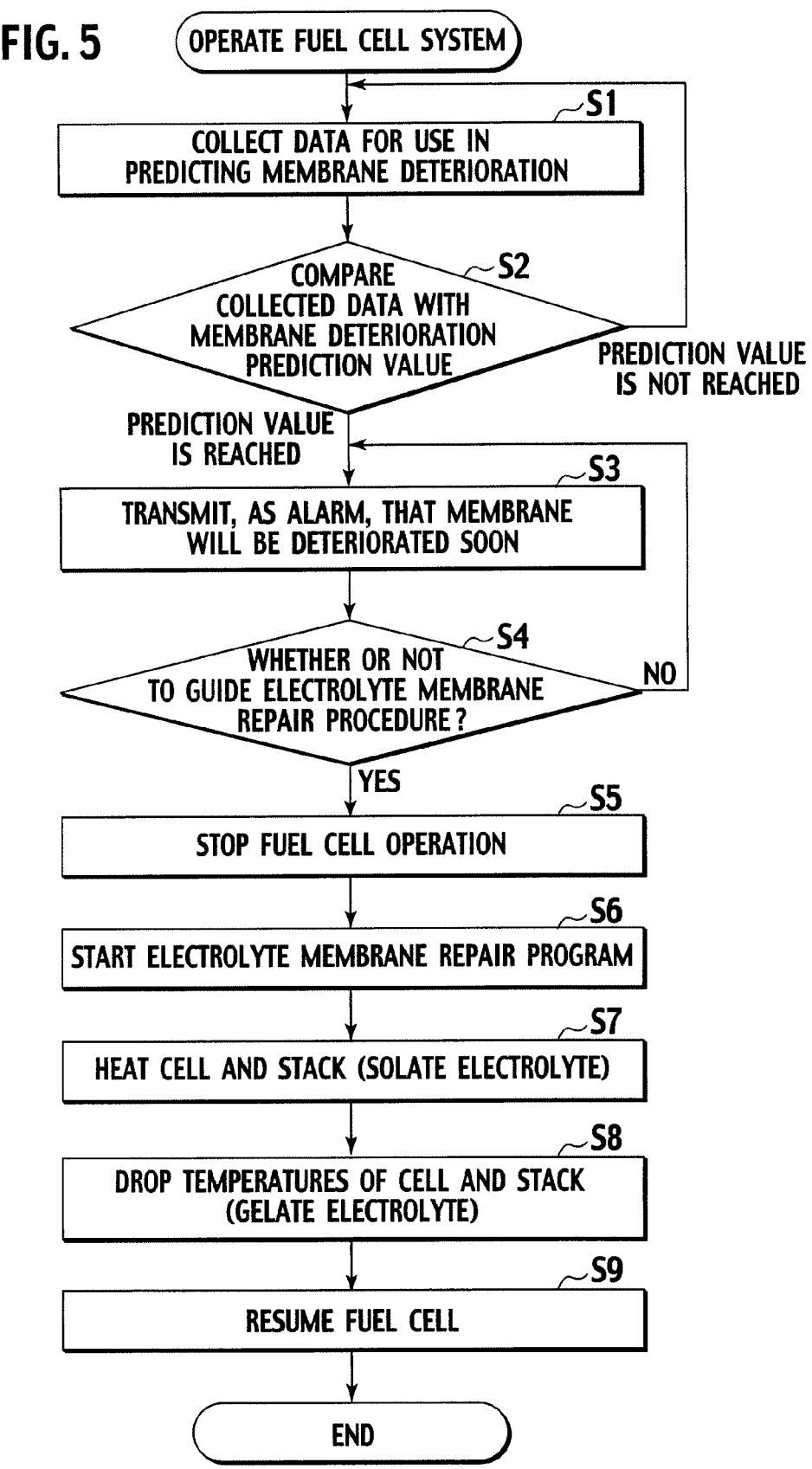
FIG. 5 is a flowchart showing an example of a control of the fuel cell system shown in FIG. 4.

FIG. 5 shows a typical control flow applied in the case of operating the above-described system. When the fuel cell system is operated, the variety of data for use in predicting the membrane deterioration, which are as described above, for example, the accumulated value of the elapse of the operation, the number of starts/stops, and the like are collected (Step S1). Next, the collected data is always compared with reference values (membrane deterioration prediction values) (Step S2). When the collected data do not reach the membrane deterioration prediction values, the collection of the data is continued. When the data reach the membrane deterioration prediction values, a message that the membrane deterioration will occur soon is transmitted by an alarm, for example, on a display, a warning lamp, and the like (Step S3). Then, an operator of the fuel cell system is notified of a failure in the electrolyte membrane, and is required to determine whether or not to execute the electrolyte membrane repair program (Step S4). When the operator rejects the execution of the electrolyte membrane repair program, the alarm is given one more time. Meanwhile, when the operator decides the execution of the electrolyte membrane repair program, the operation (power generation) of the fuel cell stack is stopped (S5), and the repair program is started (Step S6). When the electrolyte membrane repair program is started, the temperature adjustment apparatus 12 is operated based on the signal from the membrane deterioration determination/control apparatus 11. In such a way, the fuel cell stack 1 is heated for a predetermined time at the sol-gel phase transition temperature or more of the gel electrolyte composing the electrolyte membrane 2, and the gel electrolyte is solated, whereby the repair of the electrolyte membrane 2 is performed (Step S7). Then, after being held in a sol state for a predetermined time, the gel electrolyte is naturally cooled (heat-radiated), or forcibly cooled according to needs, whereby the temperature of the electrolyte membrane 2 drops to the phase transition temperature or less (Step S8). In such a way, the electrolyte membrane 2 in the sol state turns to the gel state, and can be recovered from the pinhole. After the repair program is completed, the fuel cell stack is resumed (Step S9).

Note that the electrolyte membrane repair program is executed under a temperature environment different from that of a usual stack operation situation, and accordingly, it is difficult to repair the electrolyte membrane during the operation of the fuel cell, and in usual, it is desirable that the program be executed after the operation of the fuel cell is stopped once as described above.

Moreover, the temperature adjustment apparatus 12 of the cells and the fuel cell stack is not particularly limited; however, for example, a fluid circulation line that circulates heated or cooled gas, oil and the like, and an external heater can be provided in the peripheries of the cells and the stack. Moreover, for the temperature adjustment apparatus 12, heat generation obtained by combustion of gas generated by introduction of the oxidant ($O_2$, air) to the reductant ($H_2$) side or introduction of the reductant to the oxidant side can be used.

Figure 6:
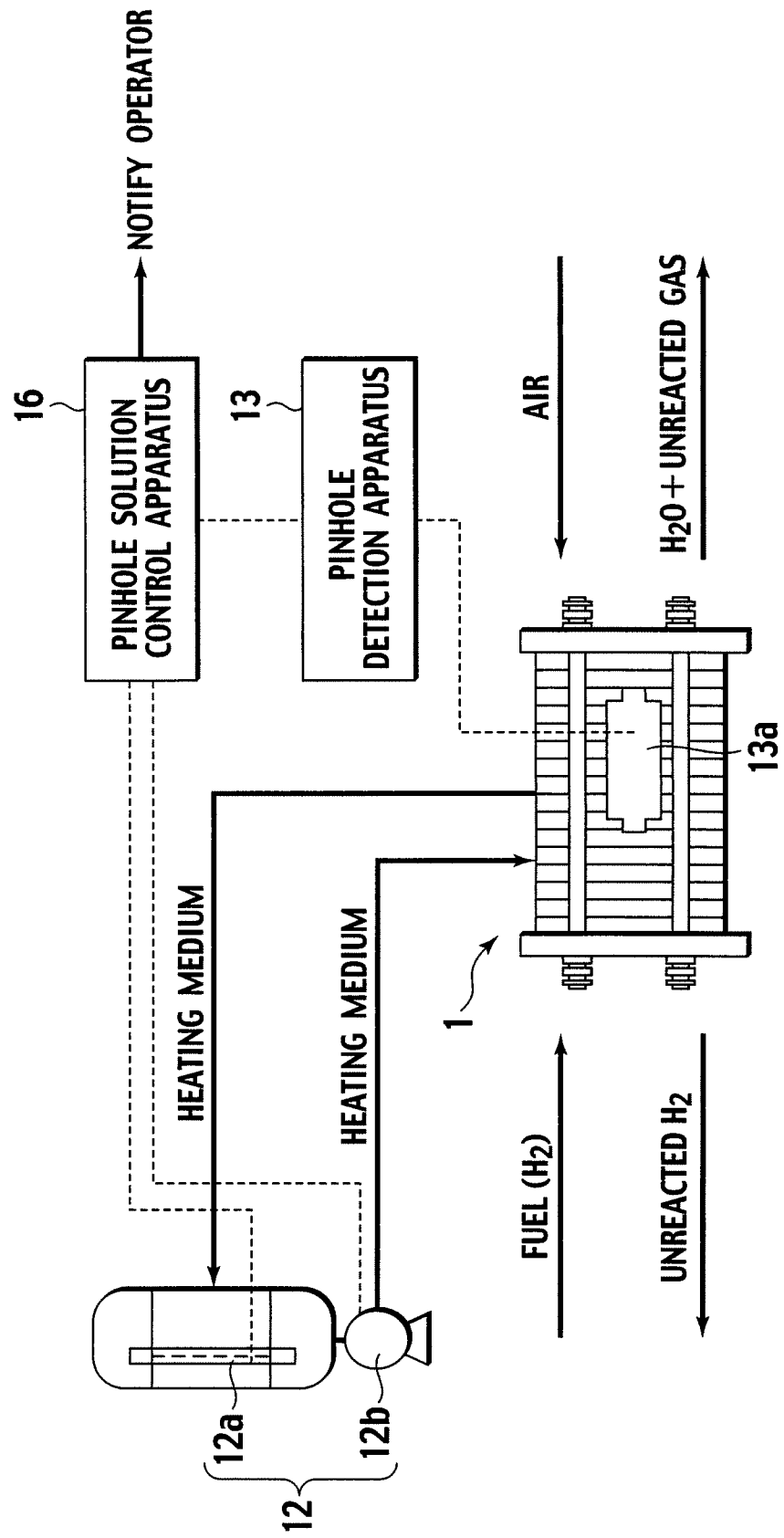
FIG. 6 is a block diagram showing another embodiment of the fuel cell system of the present invention.
Figure 7:
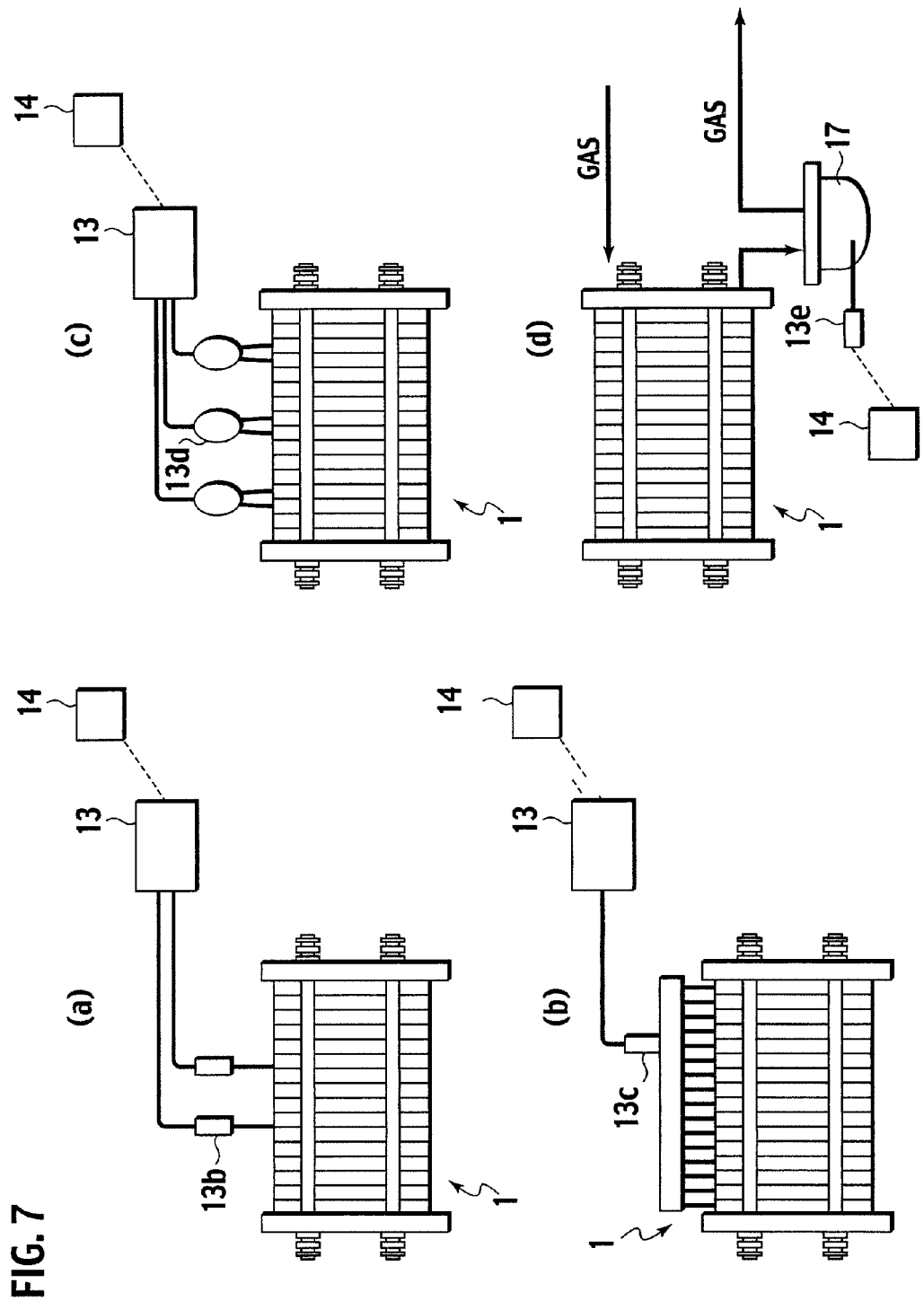
FIG. 7 is schematic views showing examples of using: (a) a thermocouple; (b) current/voltage detection terminals; (c) gas sampling ports; and (d) an ion concentration detector as a detection probe of a pinhole in the fuel cell system shown in FIG. 6.

FIG. 6 shows another suitable example of the fuel cell system according to the present invention. The fuel cell system shown in the drawing includes, as the temperature adjustment apparatus 12, a heating-medium temperature adjustment apparatus having the heater 12a and a circulation pump 12b. This temperature adjustment apparatus 12 has a function to circulate a heating-medium fluid (for example, oil) heated by the heater 12a through a heating-medium passage to the fuel cell stack 1. Moreover, the fuel cell system includes: the pinhole detection apparatus 13 that is coupled to a detection probe 13a disposed in the fuel cell stack 1 and detects the pinhole; and a pinhole solution control apparatus (operation control apparatus) 16 coupled through a data bus to the temperature adjustment apparatus 12, the pinhole detection apparatus 13, and a power generation controller (not shown) that controls the power generation of the respective cells.

The pinhole detection apparatus 13 has a function to capture a signal for diagnosing the pinhole, which is sent from the detection probe 13a, and has a function to administer a process for computationally operating the signal for determining whether or not the pinhole exists. In the system, when the pinhole detection apparatus 13 detects the occurrence of the pinhole, trigger information for starting the electrolyte membrane repair program is sent to the pinhole solution control apparatus (operation control apparatus) 16. Thereafter, the pinhole solution control apparatus 16 starts the above-described electrolyte membrane repair program, and instructs the temperature adjustment apparatus 12 to heat the electrolyte membrane. Accordingly, there can be avoided such waste that the fuel cell is stopped and the stack is heated and cooled in spite of the fact that the pinhole does not occur.

A type of a specific apparatus for detecting the pinhole, that is, a type of the above-described detection probe 13a is not particularly limited; however, for examples, ones as shown in FIGS. 7(a) to 7(d) can be illustrated. FIG. 7 is views for explaining outlines of placing the detection probe 13a of the pinhole detection apparatus 13 to the fuel cell stack 1. As the detection probe 13a, there can be used: a thermocouple of FIG. 7(a); current/voltage detection terminals of FIG. 7(b); gas sampling ports of FIG. 7(c); an ion concentration detector of FIG. 7(d); and the like. These illustrated probes are disposed in appropriate places in response to characteristics thereof. A description will be specifically made below of detection principles in the case of using the respective detection probes 13a.

(1) Detection of Pinhole by Thermocouple

A description will be made of the principle of detecting the pinhole by using the thermocouple. When the electrolyte membrane 2 is deteriorated, and the pinhole occurs, the oxidant gas (oxygen) and the fuel gas (hydrogen) are mixed together in the stack, and the fuel gas starts combustion in the vicinity of the platinum electrode catalyst. Accordingly, in the vicinity of the pinhole, the cell temperature rises rapidly. Therefore, as shown in FIG. 7(a), the thermocouple 13b for the temperature detection is disposed in the fuel cell stack 1, and the above-described phenomenon is captured, thus making it possible to detect the occurrence of the pinhole.

Figure 8:
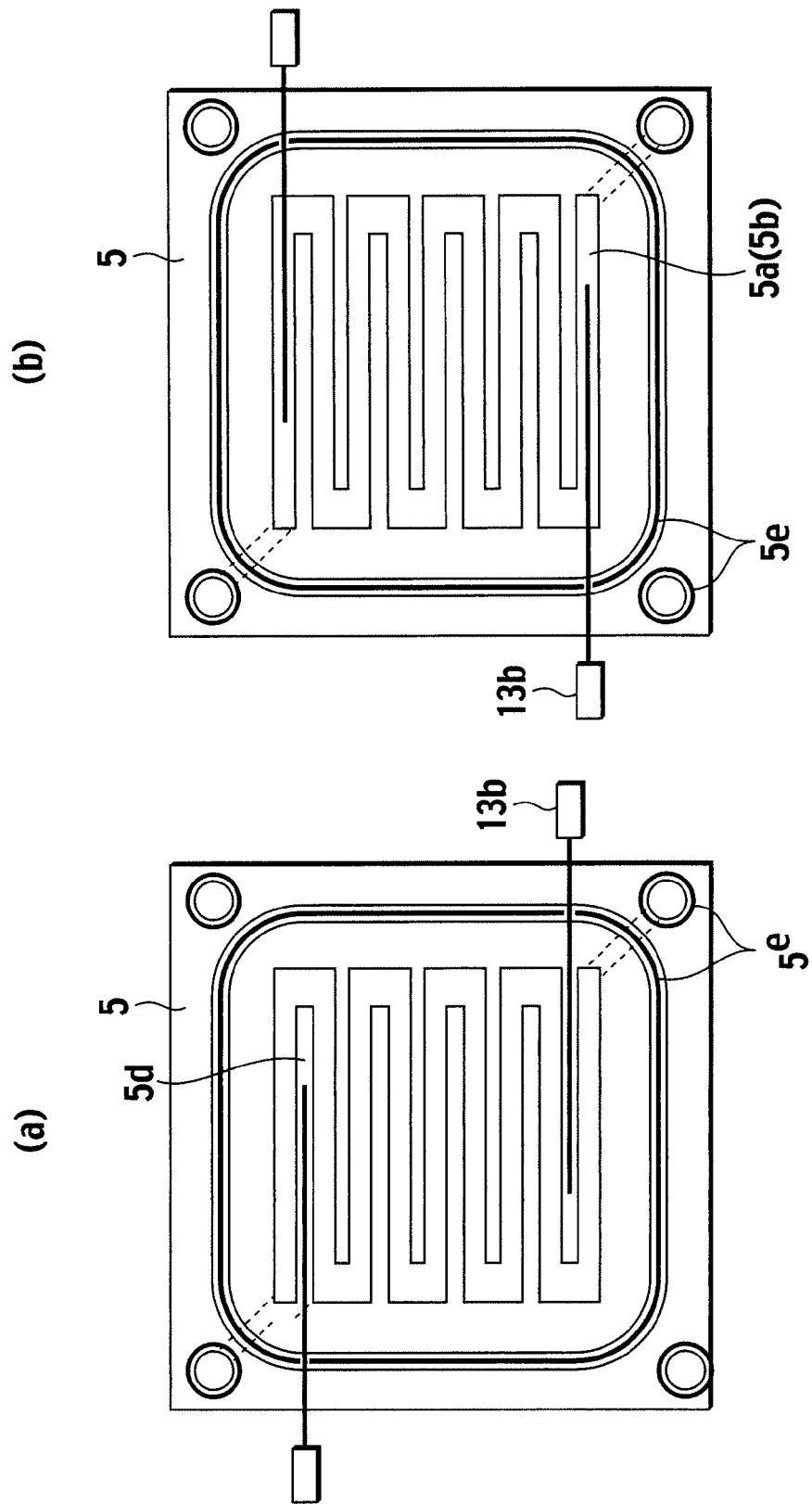
FIG. 8 is explanatory views showing attachment positions of the thermocouple shown in FIG. 7(a).

FIG. 8 shows placed states of the thermocouple 13b in the case of using the thermocouple as the detection probe 13a. As shown in FIG. 8(a), the thermocouple 13b can be disposed in an inside of a rib 5d that partitions the gas passage 5a or 5b in the separator 5, or as shown in FIG. 8(b), the thermocouple 13b can be embedded in an inside of the gas passage 5a or 5b so as not to hinder a flow of the gas. In such a way, it becomes possible to monitor a temperature change at a position in the vicinity of the electrolyte membrane 2. Note that, in FIG. 8, reference numeral 5e denotes the sealing material provided on the separator.

In particular, between the vicinities of each gas passage inlet and outlet of the cell, a concentration difference of the flowing gas is increased, and in addition, on the cathode side, a cell environment is largely changed by being affected by a generated vapor, and accordingly, it is desirable to capture the temperature change of the cell from regions concerned taken as centers. Note that, though desirably, the thermocouple 13b is placed in a density as high as possible, there are physical limitations, and a burden in the manufacturing process is increased. Accordingly, the installation sites and number of the thermocouples 13b will be decided in consideration for cost and the like.

Figure 9:
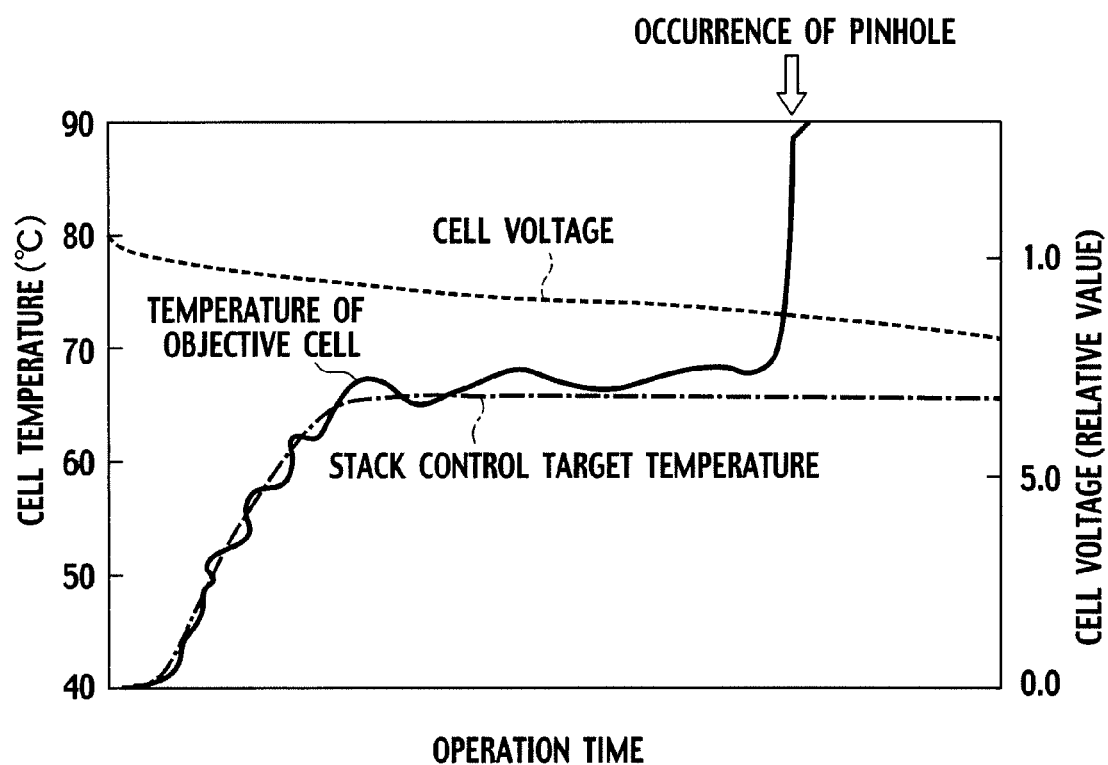
FIG. 9 is a graph showing a relationship between a fuel cell operation time and a cell temperature and a cell voltage, which is used for detecting the pinhole by the thermocouple.

FIG. 9 shows a specific example when the pinhole is detected by using the thermocouple 13b. As shown in FIG. 9, when the pinhole occurs in the electrolyte membrane 2, the fuel gas and the oxidant gas are mixed together through the pinhole, whereby the gas combustion that is other than from an electrochemical reaction occurs. Accordingly, the cell temperature exhibits an exceptional temperature rise at the same time when the pinhole occurs. As described above, the pinhole is determined to have occurred when the cell temperature exceeds a predetermined threshold value of the temperature management, thus making it possible to execute the electrolyte membrane repair program.

Figure 10:
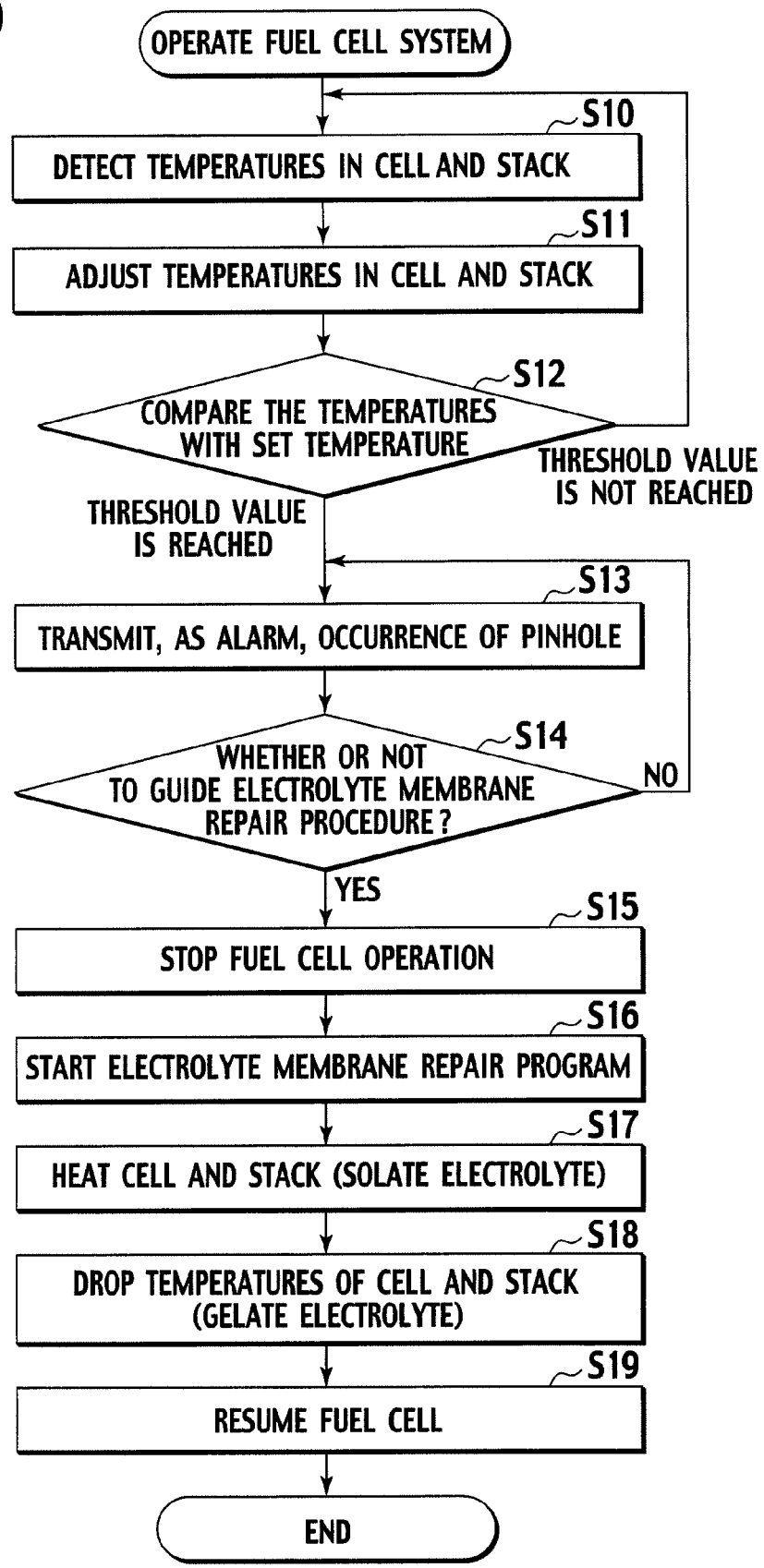
FIG. 10 is a flowchart showing a control of detecting the pinhole by the thermocouple and repairing the electrolyte membrane.

FIG. 10 shows a typical control flow applied in the case of operating the system using the thermocouple 13b. When the fuel cell system is operated, the temperatures of the cells and the stack are detected by the above-described thermocouple 13b (Step S10). Next, the temperatures are adjusted to an operation temperature (for example, 80° C.) at which the fuel cell is operated (Step S11). The detected temperatures are always compared with a set temperature, that is, the threshold value of the temperature management (Step S12). When the detected temperatures do not reach the threshold value, the pinhole is determined not to occur in the electrolyte membrane, and the detection of the temperatures is continued. When the detected temperatures reach the threshold value, the pinhole is determined to have occurred, and a message to this effect is transmitted as an alarm (Step S13). Then, the operator of the fuel cell system is notified of the failure in the electrolyte membrane, and is required to determine whether or not to execute the electrolyte membrane repair program (Step S14). In the steps on and after Step S15, the repair program is executed in a similar procedure to that of Steps S5 to S9 in FIG. 5 (Step S15 to S19).

(2) Detection of Pinhole by Current/Voltage Detection Terminals

Figure 11:
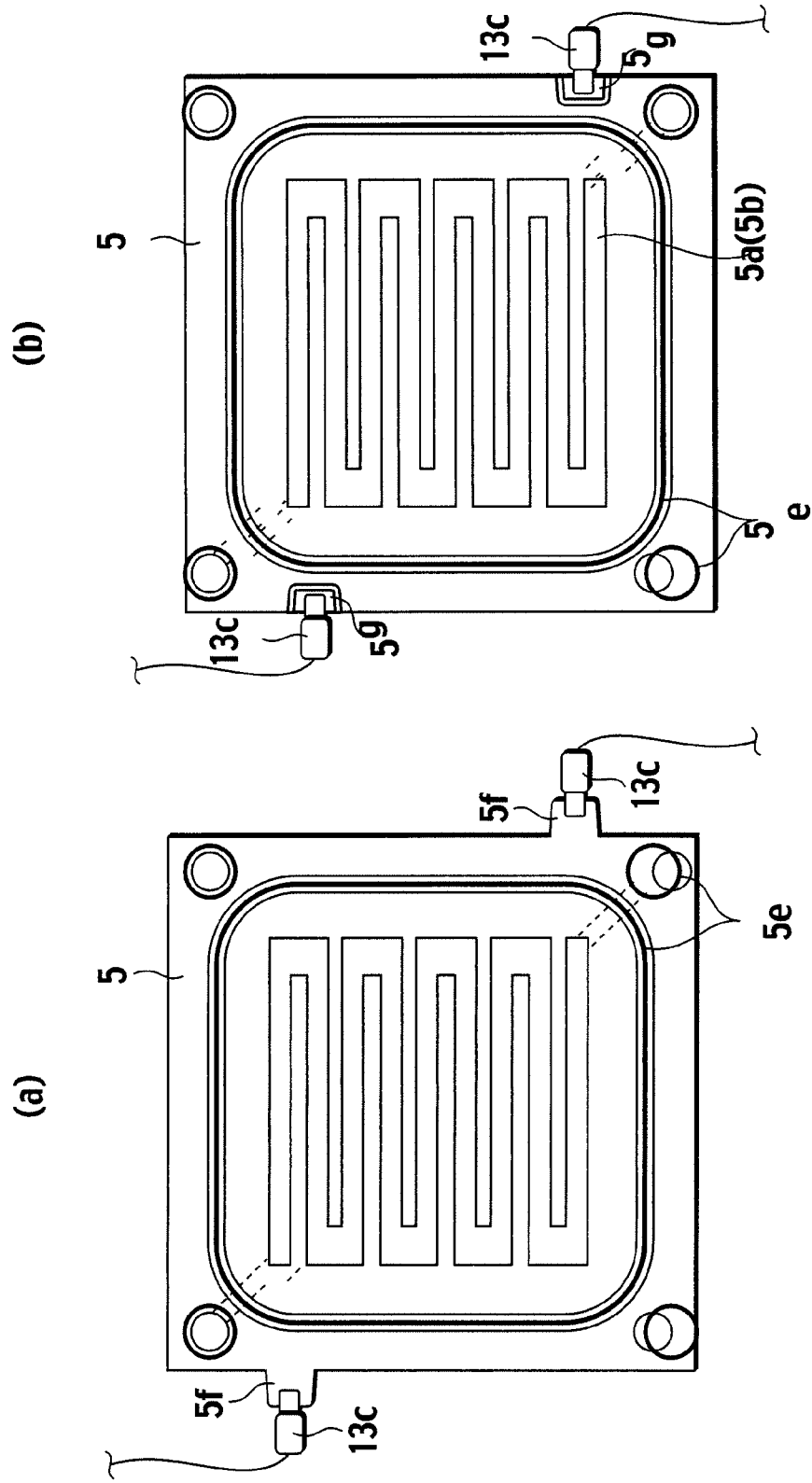
FIG. 11 is views showing attachment positions of the current/voltage detection terminals shown in FIG. 7(b).

Next, a description will be made of the principle of detecting the pinhole by using the current/voltage detection terminals. FIG. 11 shows placed states of current/voltage detection terminals 13c provided in the cell as shown in FIG. 7(b) in the case of using the terminals 13c as the detection probe 13a. It becomes possible to place the current/voltage detection terminals 13c by using, as shown in FIG. 11(a), protruding tabs 5f formed on the separator 5 in which the gas passage is formed, or using recessed terminal attachment regions 5g as shown in FIG. 11(b). Moreover, though FIG. 11 shows a model in which the detection terminals 13c with a clip shape are assumed, it is also possible to adopt a mode capable of detecting voltages of the plurality of cells by comb-type detection terminals.

Note that, though it is desirable that the current/voltage detection terminals 13c be placed for each of the cells of the stack 1, it is also possible to monitor the currents and the voltages by attaching the current/voltage detection terminals 13c for every two to three cells under a condition where limitations on design and manufacture of the stack are present.

Figure 12:
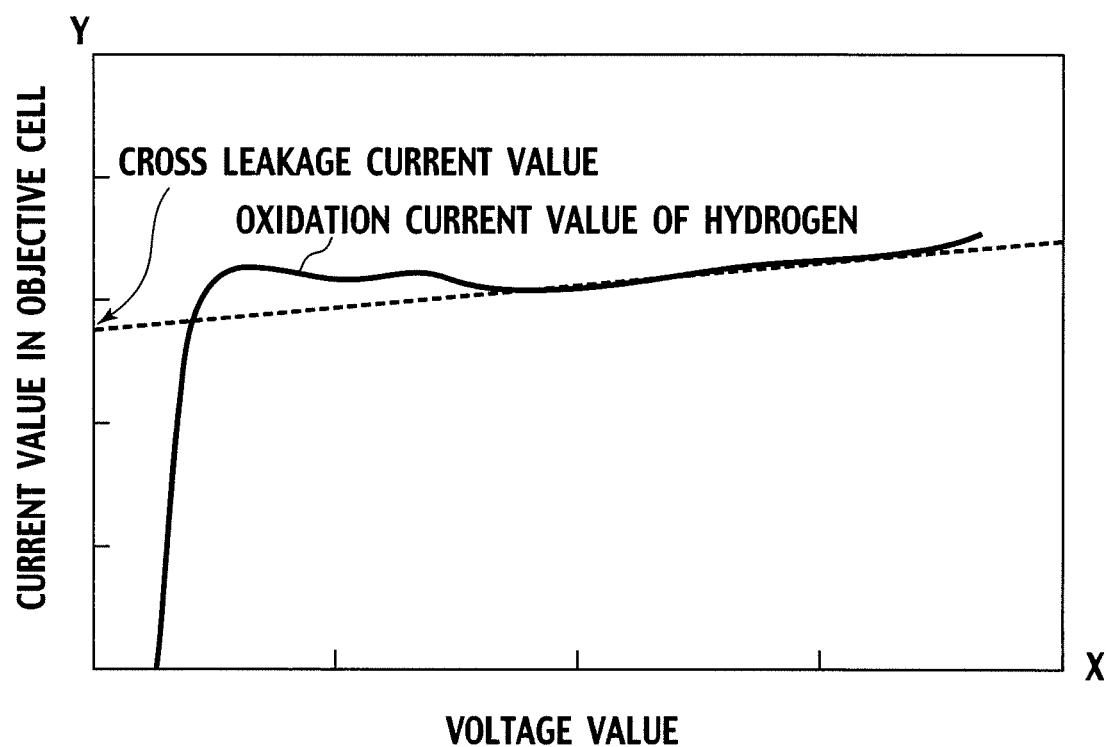
FIG. 12 is a graph showing a calculation method of a current value of cross leakage in the pinhole detection by the current/voltage detection terminals.

FIG. 12 shows a graph for explaining the principle of detecting the pinhole by using the current/voltage detection terminals 13c as the detection probe 13a. In the case of diagnosing the state of the cells, at the time when the operation of the fuel cell stack 1 is stopped, hydrogen is supplied to the anode electrodes of the respective cells, nitrogen is supplied to the cathode electrodes thereof, and in that state, a voltage is applied to such a cell to be diagnosed. At this time, a current-voltage value as shown in FIG. 12 can be obtained by an oxidation reaction of the hydrogen, and moreover, based on a behavior of this current value, it is possible to detect, as a current value, an amount of the cross leakage of the cell. Specifically, as shown by the graph, the cross-leakage current value can be obtained from a Y-axis intercept, that is, a point where an approximation line intersects a current value axis. Here, the Y-axis intercept is obtained by performing collinear approximation for a gradient of the current value with respect to the voltage, which is obtained at the time when a predetermined voltage is applied. Here, if the pinhole occurs, then the hydrogen leaks, and the electrochemical reaction of the hydrogen occurs in the cathode. Accordingly, a phenomenon that an oxidation current value of the hydrogen is increased occurs. When the oxidation current value of the hydrogen is increased, the cross-leakage current value is also increased. Hence, by observing a change of this cross-leakage current value, it becomes possible to detect the pinhole.

Figure 13:
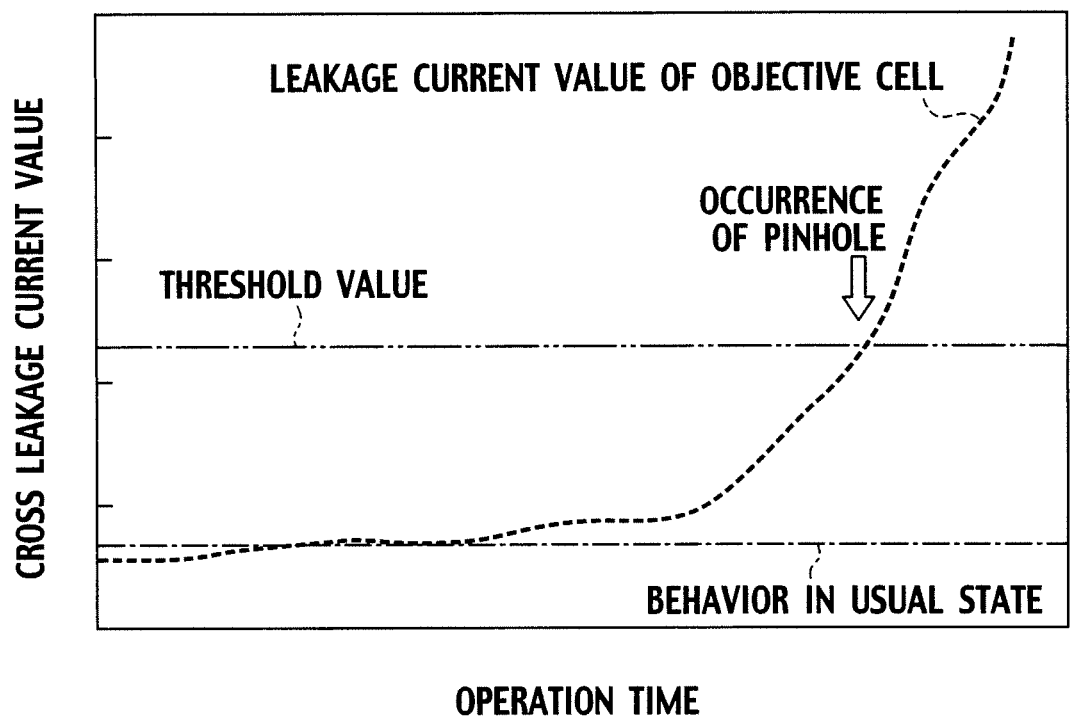
FIG. 13 is a graph showing a relationship between the fuel cell operation time and the current of the cross leakage, which is used for detecting the pinhole by the current/voltage detection terminals.

FIG. 13 shows a specific example of the pinhole detection using a current/voltage monitor in the cell on which the current/voltage detection terminals 13c are provided. As illustrated, if the pinhole occurs in the electrolyte membrane, then the cross-leakage current value of the cell, which is detected by the method shown in FIG. 12, is gradually increased as the operation time is elapsing. Hence, a threshold value of the cross-leakage current value, which is for diagnosing the occurrence of the pinhole, is obtained in advance from a test operation of the system, and the pinhole is determined to have occurred when the cross-leakage current value exceeds the threshold value, whereby the electrolyte membrane repair program can be executed. In the case of this method, the diagnosis of the cell is implemented periodically or when the operation of the stack is stopped, whereby the occurrence of the pinhole can be detected early, thus making it possible to maintain the performance of the stack.

Figure 14:
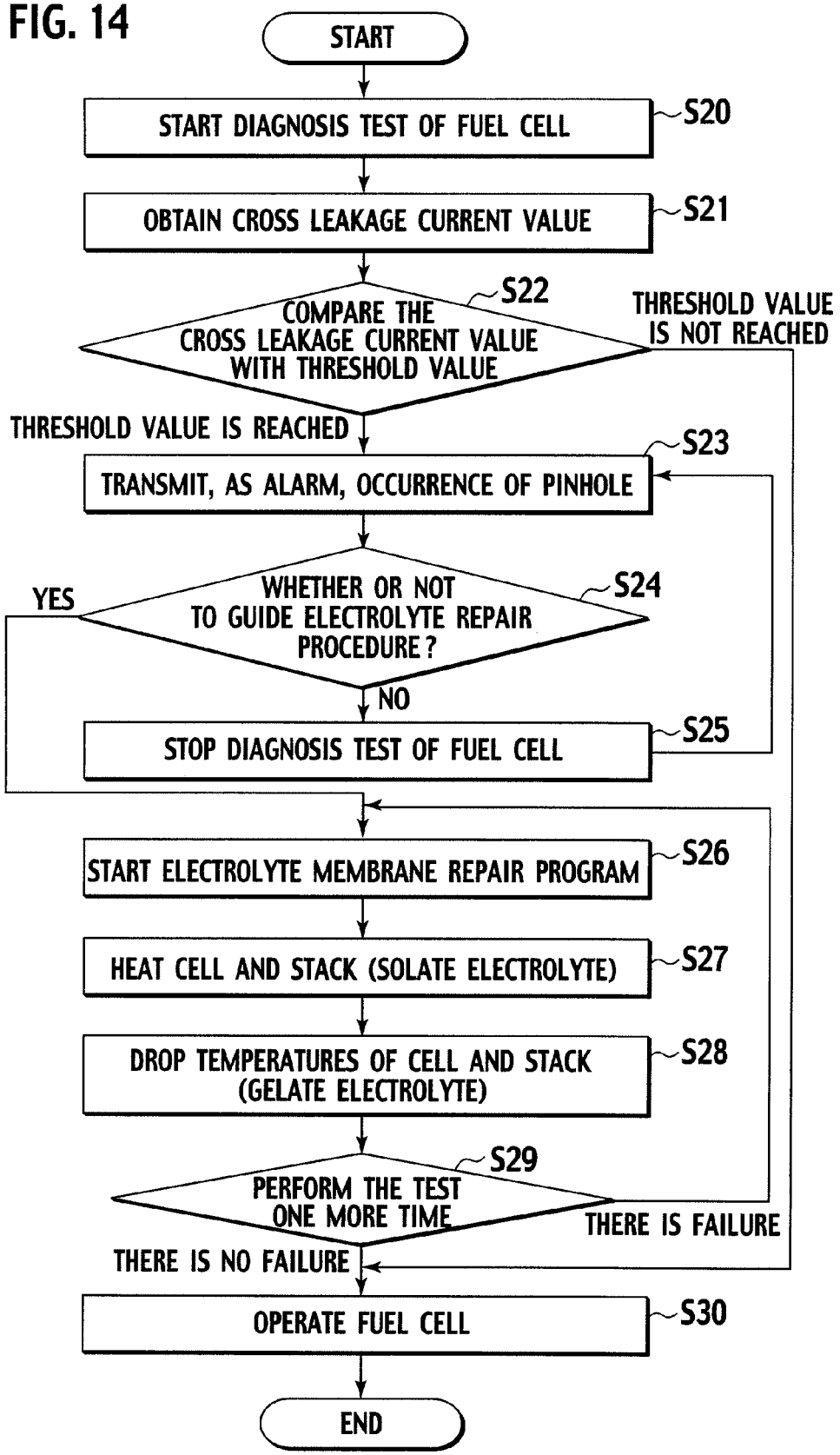
FIG. 14 is a flowchart showing a control of detecting the pinhole by the current/voltage detection terminals and repairing the electrolyte membrane.

Moreover, FIG. 14 shows a typical control flow applied in the case of operating the system by using the current/voltage detection terminals 13c. First, the operation of the fuel cell stack 1 is stopped, and a diagnosis test of the fuel cell stack is started (Step S20). Next, the current-voltage value of the target cell is detected, and the cross-leakage current value is obtained (Step S21). As shown in FIG. 13, the obtained cross-leakage current value is always compared with the threshold value (Step S22). When the cross-leakage current value does not reach the threshold value, the pinhole is determined not to occur in the electrolyte membrane, and a usual operation of the fuel cell system is performed (Step S30). When the cross-leakage current value reaches the threshold value, the pinhole is determined to have occurred, and the message to this effect is transmitted as the alarm (Step S23). Then, the operator of the fuel cell system is notified of the failure of the electrolyte membrane, and is required to determine whether or not to execute the electrolyte membrane repair program (Step S24). When the operator rejects the execution of the electrolyte membrane repair program, the diagnosis test of the fuel cell stack is stopped (Step S25), and the alarm is given one more time. Meanwhile, when the operator decides the execution of the electrolyte membrane repair program, the repair program is started (Step S26). When the electrolyte membrane repair program is started, the temperature adjustment apparatus 12 is operated based on the signal from the pinhole solution control apparatus 16. In such a way, the fuel cell stack 1 is heated for a predetermined time at a temperature equal to or more than the sol-gel phase transition temperature of the gel electrolyte composing the electrolyte membrane 2, and the gel electrolyte is solated, whereby the repair of the electrolyte membrane 2 is performed (Step S27). Then, after being held in a sol state for a predetermined time, the gel electrolyte is naturally cooled (heat-radiated), or forcibly cooled according to needs, whereby the temperature of the electrolyte membrane 2 drops to the phase transition temperature or less (Step S28). In such a way, the electrolyte membrane 2 in the sol state turns to the gel state, and can be recovered from the pinhole. Thereafter, the diagnosis test of the fuel cell stack is performed one more time (Step S29). When the cross-leakage current value reaches the threshold value as a result of such re-diagnosis, the electrolyte membrane repair program is executed one more time (Step S26). When the cross-leakage current value does not reach the threshold value, the pinhole is determined to have been solved, and the usual operation of the fuel cell stack is performed (Step S30).

(3) Detection of Pinhole by Gas Sampling Ports

Figure 15:
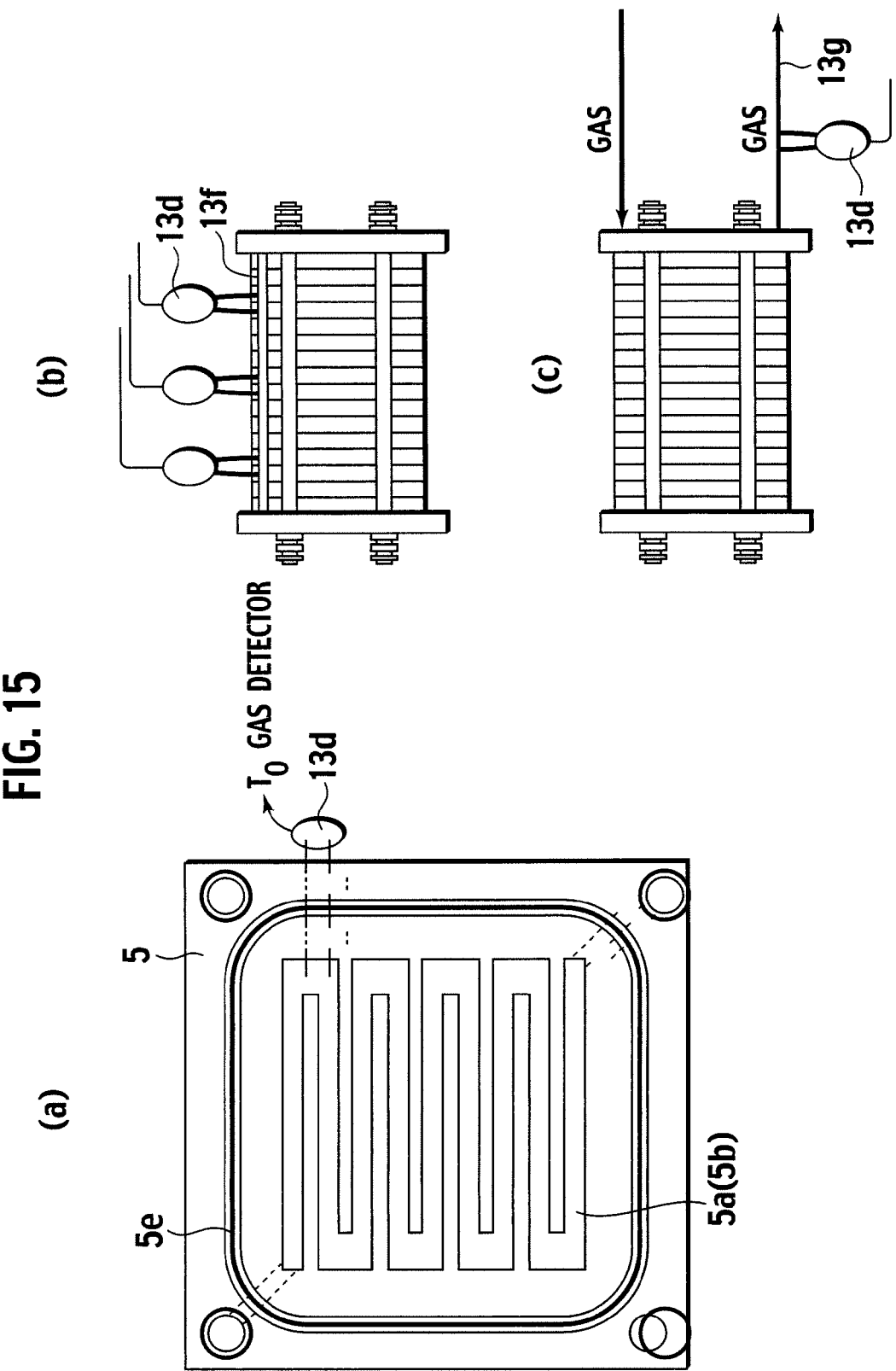
FIG. 15 is explanatory views showing attachment positions of the gas sampling ports shown in FIG. 7(c).

Next, a description will be made of the principle of detecting the pinhole by using the gas sampling ports. FIG. 15 shows placed positions of the gas sampling ports 13d in the case of using the sampling ports 13d as the detection probe 13a. As a gas sensor functioning as the pinhole detection apparatus 13, it is desirable to use a gas analysis apparatus represented by gas chromatography.

Desirably, sampling of sample gas for the diagnosis test is directly performed from the inside of the cell by disposing the gas sampling port 13d in the gas passage 5a or 5b as shown in FIG. 15(a). However, there is also an apprehension that such disposition may cause a disturbance to the gas flow in the gas passage, and accordingly, it is also effective to dispose the gas sampling ports 13d onto a gas manifold 13f communicating with the plurality of cells as shown in FIG. 15(b) and onto a gas discharge line 13g from the stack as shown in FIG. 15(c). In particular, the gas sampling ports 13d are placed onto a line of the cathode, where a large amount of the oxidant gas exists, thus making it possible to easily detect cross leakage of a trace amount of combustible gas ($H_2$).

These gas sampling ports 13d are connected to the gas sensor that includes a sampling device such as a 6-way valve and serves as the pinhole detection apparatus 13. The samples for the diagnosis test, which are taken from the respective sampling ports 13d, are analyzed by the gas sensor. Here, as the detected gas, hydrogen ($H_2$) is illustrated on the cathode electrode (oxidant electrode), and oxygen ($O_2$) is illustrated on the anode electrode (fuel electrode). The state of the cross leakage is determined based on the amount of the detected gas. Desirably, the gas sampling ports are placed on the stacks as many as possible; however, the installation sites thereof are selected depending on limitations on design and manufacture of the stack.

Figure 16:
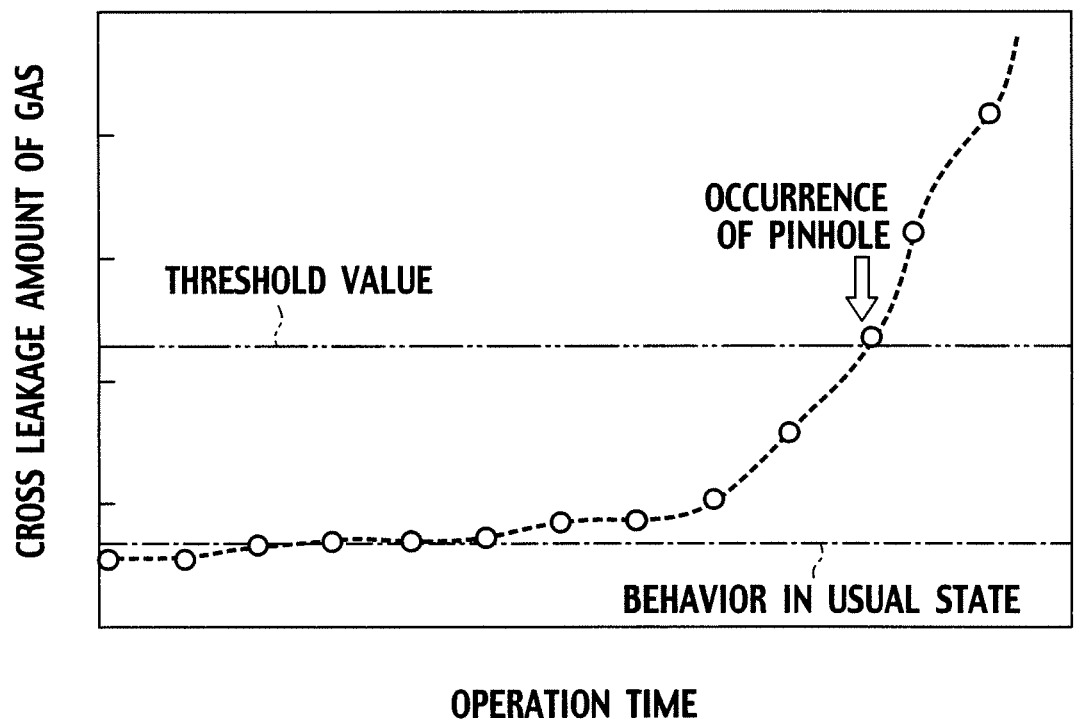
FIG. 16 is a graph showing variations of an amount of the cross leakage by the operation time, which are obtained by analyzing gas picked up from the gas sampling ports.

FIG. 16 shows a specific example in the case of monitoring the amount of the cross leakage of the gas by using the gas sampling ports 13d. As shown in FIG. 16, the amount of the cross leakage of the electrolyte membrane, which is detected by the method in FIG. 15 is gradually increased as the operation time is elapsing. Accordingly, a threshold value of the amount of the cross leakage, which is for diagnosing the occurrence of the pinhole, is obtained in advance from the test operation of the system, and the pinhole is determined to have occurred when the amount of the cross leakage exceeds the threshold value, whereby the electrolyte membrane repair program can be executed.

Figure 17:
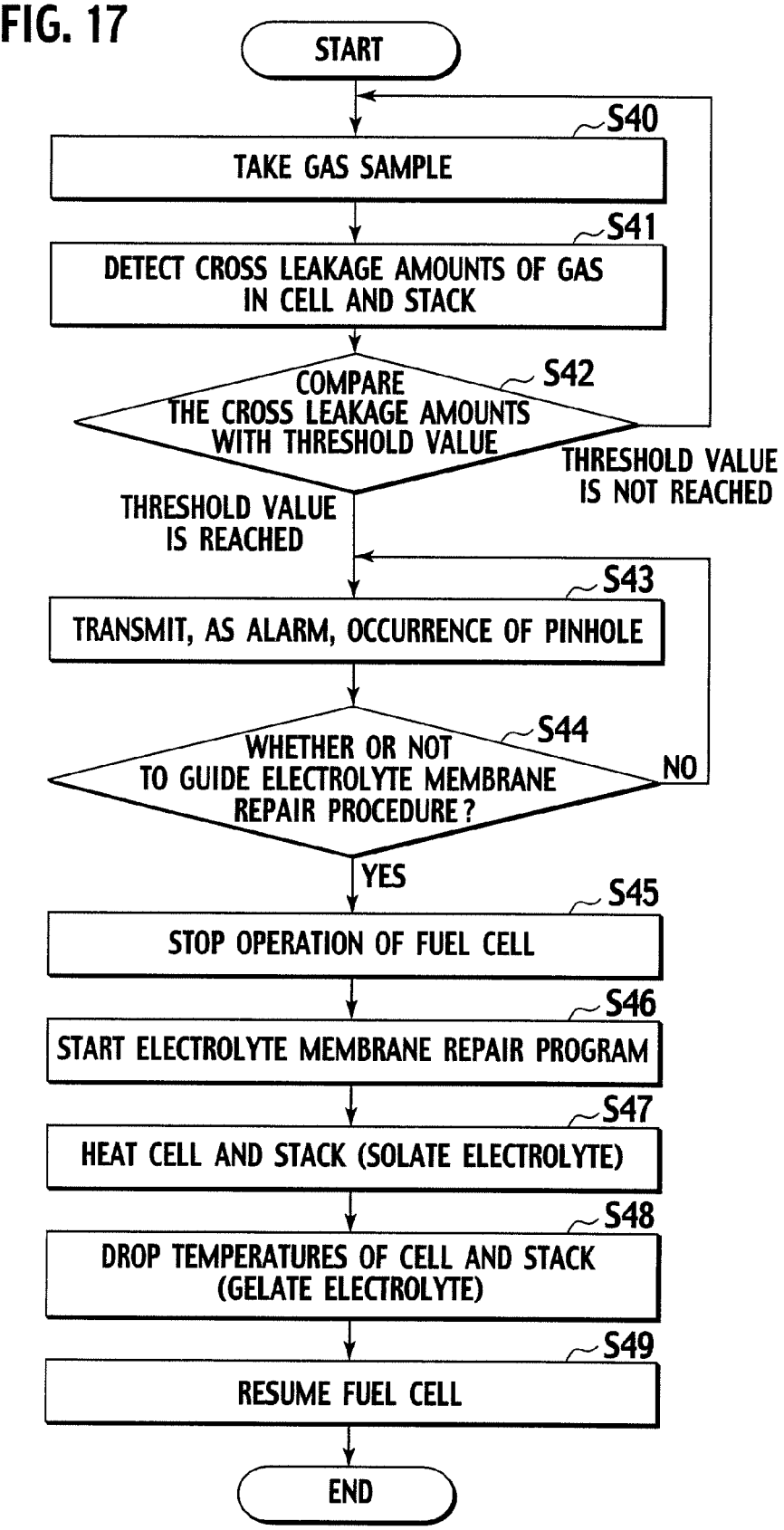
FIG. 17 is a flowchart showing a control of detecting the pinhole based on the amount of cross leakage, which is obtained by analyzing the picked gas, and repairing the electrolyte membrane.

FIG. 17 shows a typical control flow applied in the case of operating the system by using the gas taken from the gas sampling ports 13d. Note that, in the case of this method, a situation of the operation of the fuel cell can be monitored during the operation concerned, and accordingly, in the above-described control flow, a flow made on the assumption that the repair program is started during the operation is adopted. First, the gas is taken from the gas sampling ports 13d (Step S40). Next, by using the gas sensor, the amount of the cross leakage in the fuel cell is detected from the taken gas (Step S41). Thereafter, as shown in FIG. 16, the detected amount of the cross leakage is always compared with the threshold value (Step S42). When the amount of the cross leakage does not reach the threshold value, the pinhole is determined not to occur in the electrolyte membrane, and the sampling of the gas sample is performed one more time (Step S40). When the amount of the cross leakage reaches the threshold value, the pinhole is determined to have occurred, and the message to this effect is transmitted as the alarm (Step S43). In the steps on and after Step S44, the repair program is executed in a similar procedure to that of Steps S4 to S9 in FIG. 5 (Step S44 to S49).

Moreover, in the fuel cell system of the present invention, a driver is enable to determine whether or not the repair program is executable based on a running situation in the case where the fuel cell is started as a power source of a mobile body or the like, and accordingly, highly effective start of the electrolyte membrane repair program can be realized.

(4) Detection of Pinhole by Ion Concentration Detector

Next, a description will be made of the principle of detecting the pinhole by using the ion concentration detector 13e. When the deterioration occurs in the membrane electrode assembly, together with the discharged gas from the fuel cell, $F^-$ and $SO_4^{2-}$ are discharged from a resin component composing the electrolyte owing to the deterioration of the electrolyte material, and organic acids ($Rf-COO^-$, $Rf-SO_3^-$) generated by degradation of the resin component are discharged. Moreover, though not directly related to the deterioration of the membrane electrode assembly, metal cation species eluted from the catalyst, a carrier (carbon black or the like) of the catalyst, and the separators (carbon separators or metal separators) are discharged together with the discharged gas as the fuel cell is being operated. The metal cation species are entrapped by ion exchange with $H^+$ in the electrolyte membrane by means of an ion exchange capacity of the electrolyte membrane, and accordingly, $H^+$ discharged thereby can also be taken as an index of the deterioration of the electrolyte membrane. Moreover, as counter ions to anion species such as $F^-$ and $SO_4^{2-}$ and the organic acids ($Rf-COO^-$, $Rf-SO_3^-$) generated by the degradation of the resin component, $H^+$ is also contained in the discharged gas by ion exchange with the metal cation. In this embodiment, an amount of the ion species in the exhaust gas is detected, whereby the pinhole is detected.

For the ion species, the ion concentration detectors corresponding to the detection targets thereof can be appropriately selected. In particular, $F^-$ and $SO_4^{2-}$ are mentioned as ones with large elution amounts, and $H^+$ as the counter ions to these anion species is detected, thus making it possible to obtain the sum of the concentrations of the anion species. Accordingly, the $H^+$ ion concentration (pH) is detected, thus making it possible to detect the pinhole with good sensitivity.

As described above, the ion concentration detector that detects the above-described ion species is disposed on the line of the discharged gas discharged from the fuel cell, thus making it possible to detect the amount or concentration of the ions contained in the discharged gas. Such information obtained by the ion concentration detector 13e is transmitted to the pinhole detection apparatus 13, and the diagnosis for the deteriorated state of the membrane electrode assembly is performed based on determination criteria stored in advance in the pinhole detection apparatus 13. Specifically, a discharge behavior of the above-described ion species discharged from the fuel cell in the state where the membrane electrode assembly is deteriorated is obtained in advance, and the deterioration determination criteria for the electrolyte membrane are determined. Then, the detected ion concentration and the determined criteria are compared with each other, thus making it possible to accurately determine such a deteriorated state of the membrane electrode assembly.

With regard to an installation site of the ion concentration detector 13e, the ion concentration detector 13e just needs to be disposed on the discharge line of at least any one of the anode and the cathode; however, preferably, the ion concentration detectors 13e are disposed on both of the electrodes from a viewpoint of grasping the situation of the ion species discharged from the fuel cell more in detail. Note that, in the case of attaching the ion concentration detector 13e only on any one of the discharge lines, it is desirable to provide the ion concentration detector 13e on the discharge line on the cathode side.

Moreover, depending on a type of the ion concentration detector 13e, in some cases, it is more suitable to detect the ion concentration in drained water that is condensed than in the gas containing the vapor. Therefore, as shown in FIG. 7(d), a configuration can also be adopted, in which a drain tank 17 is placed on the discharge line of the fuel cell stack, the drained water discharged from the stack is collected, and the concentration of the ions contained in the collected drained water is detected. In this case, when a capacity of the drained water is too large, the sensitivity is decreased with respect to the change of the ion concentration. Accordingly, it is desirable to set the capacity at an appropriate size in response to the size and power generation capability of the fuel cell. In the case of attaching a coagulation device of such drained water as described above, in order to prevent power generation characteristics of the fuel cell from being changed by a phenomenon that the drained water flows back to the fuel cell, it is desirable that the coagulation device be placed below a position of the discharged gas outlet of the fuel cell in the vertical direction. Although it is also possible to provide a backflow prevention device of the drained water, it is not preferable to vary the power generation characteristics of the fuel cell by the fact that such a device that brings a pressure loss is attached onto the gas discharge line of the fuel cell. Also from this viewpoint, it is advantageous that the drained water is dealt with the disposition of the coagulation device.

Moreover, it is also possible to enhance a response rate with respect to the change of the ion concentration in such a manner that a control sequence is provided separately, the coagulation of the drained water is merged into a batch operation, and such an operation is performed, which has a cycle of: coagulation→detection of ion concentration in drained water→discharge of drained water→coagulation.

Note that, in a system using a conventional fluorinated polymer electrolyte membrane represented by Nafion (registered trademark), it is common to humidify gas to be supplied thereto in order to fully exert performance of the electrolyte membrane. Meanwhile, in such an electrolyte membrane applied with an electrolyte material capable of maintaining proton conductivity even in a state where water does not coexist with the electrolyte, for example, with the ionic liquid, it is not necessary to humidify the gas to be supplied. No matter whether or not the gas to be supplied may be humidified, the discharged gas contains vapor since water is created from the reaction of hydrogen and oxygen.

Moreover, in the case of using the electrolyte membrane in which the electrolyte is made of the ionic liquid, the fuel cell can be operated without humidifying the gas from the outside unlike the conventional polymer electrolyte membrane from the facts that the ionic liquid itself has an extremely low vapor pressure and that the ionic liquid itself has a high ion concentration. Therefore, in the fuel cell using the ionic liquid, it becomes unnecessary to humidify the gas in advance, and accordingly, an amount of moisture flowing out from the fuel cell is reduced. However, since the water is created by the power generation of the fuel cell, the vapor is contained in the discharged gas, and accordingly, the ion concentration detector 13e can be applied.

Figure 18:
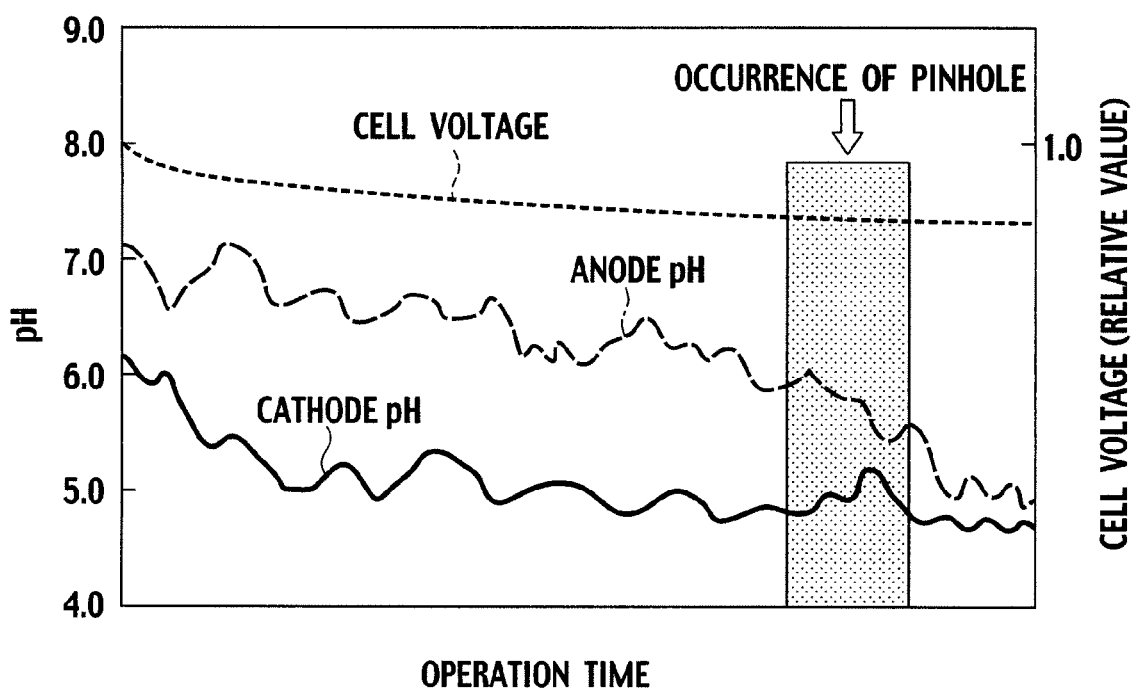
FIG. 18 is a graph showing pH variations, by the operation time, of drained water from an anode and a cathode, which are detected by the ion concentration detector shown in FIG. 7(d).

FIG. 18 shows an example of relationships of a cell voltage and of pH behaviors in the drained water discharged from the anode and the cathode with respect to the operation time in the case where the power is generated in the single cell. While the power was being generated, such a leakage current between the cells was measured as appropriate, and the determination as to the pinhole in the membrane electrode assembly was performed. In this case, during a period while the leakage current was detected, which is indicated by a shaded portion shown in FIG. 18, the pinhole occurred in the electrolyte membrane. However, since large variations are not observed in the cell voltage before and after the occurrence of the pinhole, it is difficult to detect the pinhole based on the cell voltage even if the pinhole occurs.

Meanwhile, with regard to the behaviors of the anode pH and the cathode pH, the cathode pH exhibits a lower value (acidity) than the anode pH at the beginning of the power generation, and tends to be gradually decreased. As opposed to this, the anode pH exhibits somewhat higher pH than the cathode, and tends to be decreased in a similar way to the cathode pH while exhibiting some difference in pH value between both electrodes. However, the tendency toward the decrease of the anode pH is accelerated from a point of time when the pinhole is assumed to have occurred in the membrane, and shortly, a difference between the cathode pH and the anode pH tends to be reduced, and both thereof tend to head for values substantially equivalent to each other.

The behaviors of the ion components in the discharged gas with respect to the power generation behavior, which are as described above, are grasped in advance, and the criteria by which the electrolyte membrane is pierced are set in the pinhole detection apparatus 13, whereby the determination as to the pinhole in the electrolyte membrane can be performed. For the determination criteria of the pinhole, a method of setting threshold values of the pHs can be mentioned as an example thereof since the pHs of both of the anode and the cathode tend to be decreased. Moreover, the decrease rates of the pHs are changed with the power generation time, and accordingly, a method of performing the determination by means of variations of the pHs per time can also be used. Furthermore, in the case of a system that includes the ion concentration detectors on both electrodes, it is also possible to monitor the values of the pHs on both electrodes, and to perform the determination by means of a difference therebetween.

Note that, in a fuel cell vehicle, considering that the fuel cell vehicle runs under a variety of environmental conditions, it is assumed that other ion components are captured in the air for use as the oxidant gas, and that the ion components affect the detection of the pinhole. In this case, the ion concentrations in the air immediately before being supplied to the fuel cell are detected, and based on values thereof, the variations of the concentrations of the ions discharged from the fuel cell are estimated, thus making it possible to compensate such an influence from the other ion components.

Figure 19:
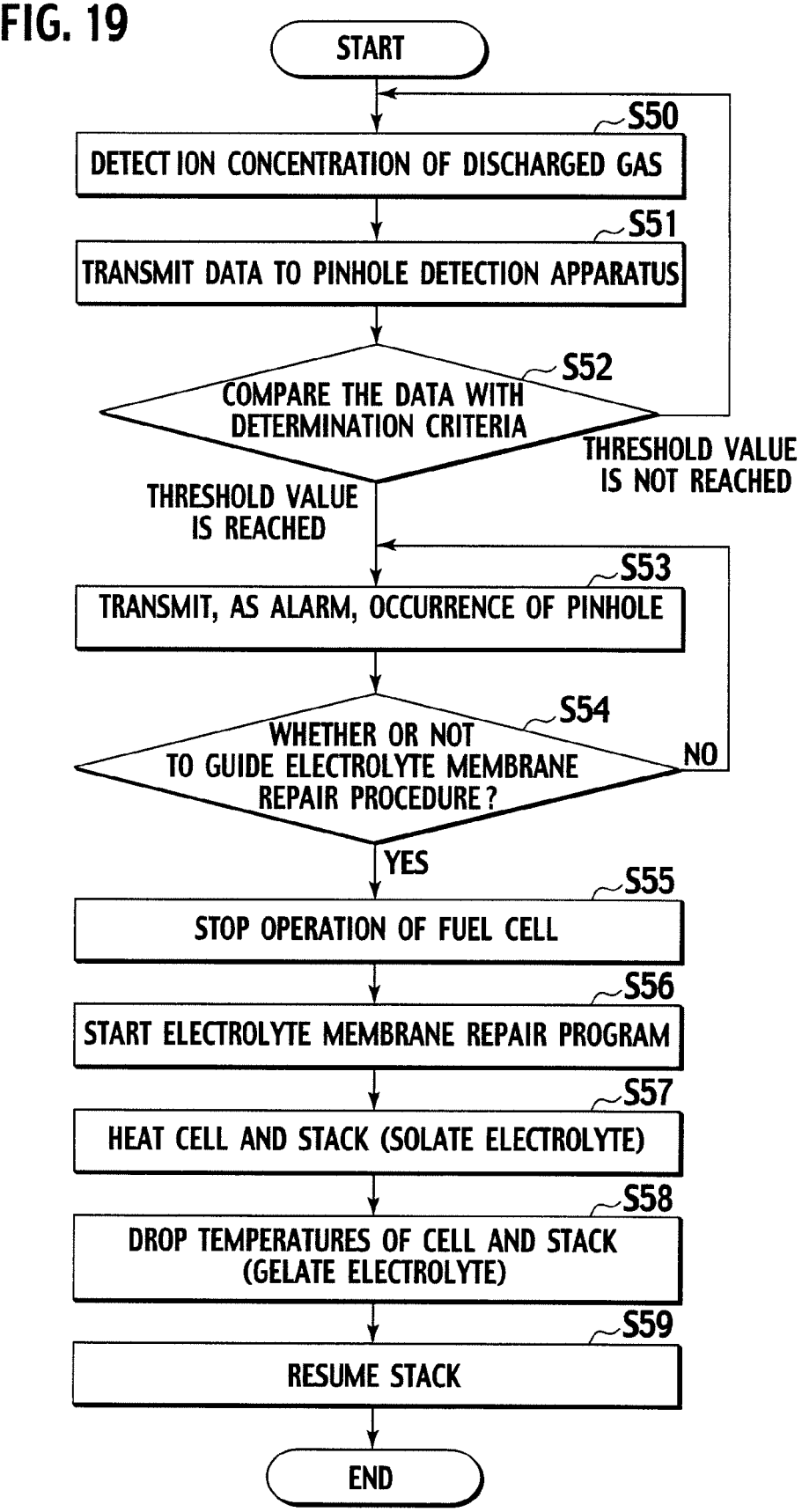
FIG. 19 is a flowchart showing a control of detecting the pinhole based on an amount of eluted ions, which is detected by the ion concentration detector, and repairing the electrolyte membrane.

FIG. 19 shows a typical control flow applied in the case of operating the system by using the ion concentration detector 13e. First, the ion concentrations in the discharged gas are detected by using the ion concentration detector 13e (Step S50). Next, data on the detected ion concentrations is transmitted to the pinhole detection apparatus 13 (Step S51). Thereafter, as shown in FIG. 18, the detected ion concentrations are always compared with the threshold values (Step S52). When the ion concentrations do not reach the threshold values, the pinhole is determined not to occur in the electrolyte membrane, and the detection of the ion concentrations is performed one more time (Step S50). When the ion concentrations reach the threshold values, the pinhole is determined to have occurred, and the message to this effect is transmitted as the alarm (Step S53).

In the steps on and after Step S55, the repair program is executed in a similar procedure to that of Steps S4 to S9 in FIG. 5 (Steps S54 to S59). Note that, also in this case, the determination is performed during the operation of the fuel cell in a similar way to the method by the sampling ports 13d, and accordingly, in the execution of the electrolyte membrane repair program, the flow is allowed to be executed based on the determination of the operator.

In a very initial stage of the occurrence of the pinhole in the membrane, as shown in FIG. 18, a sufficient cell voltage is exhibited, and accordingly, the fuel cell does not become unusable soon though a decrease of fuel consumption occurs owing to the cross leakage. Therefore, the alarm is transmitted when the membrane is determined to have been pierced, and the repair program is urged to be executed as soon as possible, whereby an inconvenience situation that the fuel cell becomes unusable suddenly can be avoided.

Figure 20:
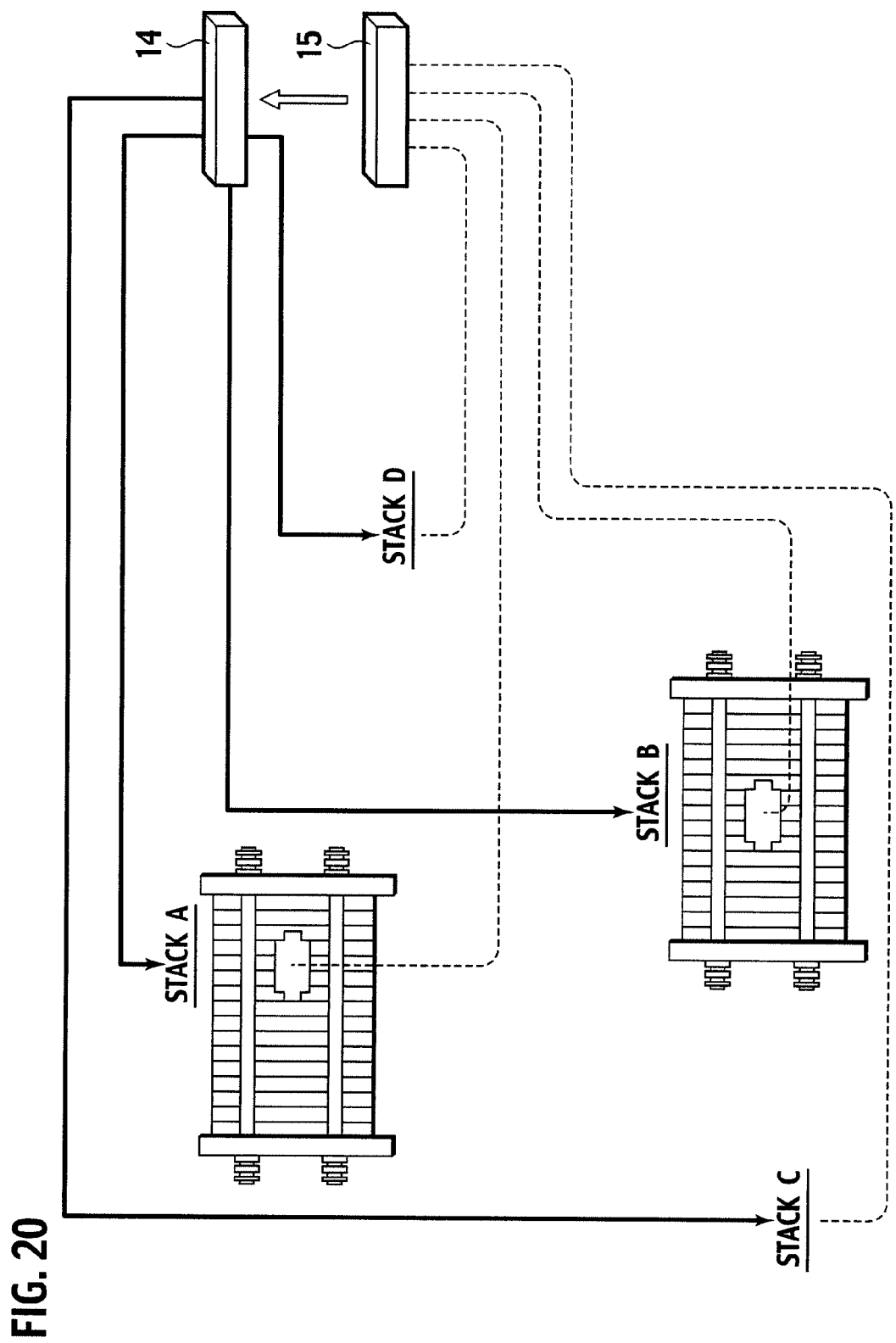
FIG. 20 is a block diagram showing an embodiment of a fuel cell system including a plurality of the fuel cell stacks.

FIG. 20 shows a fuel cell system using a plurality of the fuel cell stacks. The plurality of fuel cell stacks having the above-described structure are provided, and the pinhole detection apparatus 13 and the temperature adjustment apparatus 12 are fully used for each of the stacks, whereby the electrolyte membrane repair programs can be started independently of one another for each of the stacks. Specifically, the operation of the fuel cell stack in which the pinhole is diagnosed to have occurred in the electrolyte membrane, and the electrolyte membrane repair program is executed, whereby the electrolyte membrane in the fuel cell stack can be prevented from being deteriorated more, and it becomes possible to continue the operation of only the normal fuel cell stack in which the pinhole is not observed.

Note that FIG. 20 shows a mode of using two fuel cell stacks A and B; however, a similar mode can be adopted even in the case where three or more fuel cells are provided.

A description will be made below of the present invention more in detail by examples and comparative examples; however, the present invention is not limited to such examples.

Example 1

As the gelatinizer (fiber-like aggregate forming material), cyclo (L-Asp(OR)-L-Phe) shown in Chemical formula 3 was used. As the electrolyte, an ionic liquid (1-ethyl-3-methyl imidazolium tetrafluoroborate: $EMImBF_4$) was used, and an adjustment was performed therefor so that the gelatinizer could be contained therein in a ratio of 1% in mass conversion. Then, a resultant was heated and dissolved, and a sol solution of the ionic liquid was obtained. The obtained sol solution was impregnated into a PTFE porous membrane (Omnipore Membrane made by Millipore Corporation; pore diameter: 1 μm; thickness: 100 μm) in which a surface is subjected to water immersion treatment. Thereafter, the porous membrane was heated at a predetermined temperature, and the ambient pressure was reduced while maintaining a sol state, whereby impregnation treatment of the electrolyte to the porous membrane was performed. Then, at the room temperature, the above-described porous membrane was naturally cooled to a temperature of 120° C. or less as the sol-gel phase transition temperature, whereby an electrolyte-impregnated membrane was prepared.

On both surfaces of the obtained electrolyte membrane, electrode catalyst layer-added gas diffusion electrodes (electrode catalyst layer-added gas diffusion electrodes made by E-TEK Division, PEMEAS Fuel Cell Technologies: LT-140E-W (Pt: 0.5 $mg/cm^2$; thickness: 400 μm)) were disposed so that the electrode catalyst layers could contact the electrolyte membrane. Thereafter, on interfaces between the electrolyte membrane and the electrode catalyst layers, the sol solution of the ionic liquid into which the gelatinizer was dissolved was coated so as to be at 0.2 $ml/cm^2$, a load was applied thereto so as to be at 5 $g/cm^2$, and the sol solution was cooled at the room temperature, whereby an MEA was fabricated.

A single cell of a fuel cell was assembled by using a fuel cell (EFC05-01SP; cell area: 5 $cm^2$) made by Electochem, Inc. for the MEA, and the following evaluations were conducted therefor. Moreover, at the time of fastening the cell, a spacer corresponding to thicknesses of the electrolyte membrane, the electrode catalyst layers and the gas diffusion electrodes were disposed on the peripheries of the electrode surfaces, and a fastened state was managed by a thickness of the spacer. Note that, here, a grooving process for disposing the thermocouple was implemented for a rib of a separator of the cell, and a thermocouple with a diameter of 0.15 mm was built therein, and a test was conducted.

Hydrogen gas (30 ml/min) was supplied to an anode, oxygen gas (30 ml/min) was supplied to a cathode, and it was confirmed that the power generation characteristics (1 $mA/cm^2$, 0.5V) as the fuel cell could be obtained at 100° C. Thereafter, through holes were drilled in several spots of the electrolyte membrane by a needle in order to simulate the occurrence of the pinhole, and the cell was re-assembled to the original. After it was confirmed that the temperature of the cell rose to 100° C., the oxygen gas was supplied to the cathode side, the hydrogen gas was supplied to the anode side, and it was confirmed that a rapid change was observed in the cell temperature. Moreover, after the rise of the cell temperature was confirmed, the supply of the fuel gas and the oxidant gas was stopped, both of the electrodes were sufficiently subjected to substitution by nitrogen gas, and thereafter, a cross-leakage current value of the cell was measured as illustrated in FIG. 12. An initial cross-leakage current value and a cross-leakage current value after the drilling of the pinhole were compared with each other. Then, a change of a numeric value, which was double-digit or more, was observed, and accordingly, the occurrence of the pinhole was confirmed. Subsequently, the cell temperature was raised to 180° C., this state was held for one hour, work of recovering the electrolyte was performed, and thereafter, the cell was naturally cooled to the room temperature. As a result of measuring the cross-leakage current value of the cell, it was confirmed that the cross-leakage current value returned to a current value equivalent to that before drilling the pinhole.

Example 2

For the cell used in Example 1, in which the pinhole was provided in a simulation manner, exhaust gas on the cathode electrode side was collected, and gas components were detected therefrom by gas chromatography.

From the fact that the hydrogen gas that had been hardly detected before forming the pinhole was detected, it was confirmed that it was possible to detect the pinhole by measuring the gas components.

Next, in a similar way to Example 1, the cell temperature was raised to 180° C., this state was held for one hour, and the work or recovering the electrolyte was performed. Thereafter, the exhaust gas components on the cathode electrode were measured by the gas chromatography one more time, and then it was confirmed that there was no hydrogen gas.

Example 3

For the cell used in Example 1, in which the pinhole was provided in the simulation manner, gas discharged from the exhaust gas line on the cathode electrode side was blown into pure water, and pH in the drained water, which was derived from the components contained in the discharged gas, was measured.

Some pH variations were observed before forming the pinhole, and meanwhile, after forming the pinhole, the pH value was decreased to a large extent. From this fact, it was confirmed that the pH was varied by forming the pinhole.

Next, in a similar way to Example 1, the cell temperature was raised to 180° C., this state was held for one hour, and the work or recovering the electrolyte was performed. Thereafter, the exhaust gas on the cathode electrode side was blown into pure water one more time, and pH in the pure water was measured. Then, it was confirmed that the pH exhibited a value equivalent to that before forming the pinhole.

The entire contents of Japanese Patent Application No. 2005-23034 (filed on Aug. 9, 2005) are incorporated herein by reference.

The description has been made above of the contents of the present invention along the embodiments and the examples; however, it is self-obvious to those skilled in the art that the present invention is not limited to the descriptions of these, and that various modifications and improvements are possible.

INDUSTRIAL APPLICABILITY

The fuel cell system of the present invention uses, as the electrolyte membrane of the fuel cell, the gel electrolyte that causes the sol-gel phase change by being heated and cooled. This electrolyte membrane is in the gel state in states where the fuel cell is stopped and operated. The electrolyte membrane is heated to the sol-gel phase transition temperature range, and thereby turns to the sol state, and the fluidity thereof is increased. In such a way, a defect such as the pinhole that has occurred in the electrolyte membrane is solved, and thereafter, the temperature of the electrolyte membrane is made to drop to the sol-phase temperature range, thus making it possible to obtain the electrolyte membrane in which the defect is solved.

Moreover, the repair program of the electrolyte membrane is executed at appropriate times by the membrane deterioration determination/control apparatus and the pinhole detection apparatus. Accordingly, the performance of the fuel cell can be prevented from being decreased, and the elongation of the lifetime thereof can be achieved.

The invention claimed is:

1. A fuel cell system, comprising:
a fuel cell stack comprising a stack of a plurality of single cells, each single cell comprising:
a membrane electrode assembly in which electrode catalyst layers and gas diffusion layers are disposed on both surfaces of an electrolyte membrane formed of a gel electrolyte having a sol-gel phase transition temperature, and
separators disposed on both sides of the membrane electrode assembly,
wherein the gel electrolyte undergoes a reversible sol-gel phase change at the sol-gel phase transition temperature;
a temperature adjustment apparatus which adjusts a temperature of the electrolyte membrane in at least one of the single cells; and
an operation control apparatus operatively connected to the temperature adjustment apparatus, the operation control apparatus being configured to instruct the temperature adjustment apparatus to heat the gel electrolyte of the at least one of the single cells to a temperature sufficient to change the gel electrolyte from a gel state to a sol state when an occurrence of a pinhole in the electrolyte membrane in the fuel cell stack is predicted or detected.

2. The fuel cell system according to claim 1, wherein the operation control apparatus is configured to predict a time when the pinhole occurs in the electrolyte membrane, and instruct the temperature adjustment apparatus to heat the electrolyte membrane before the time.

3. The fuel cell system according to claim 1, further comprising:
a pinhole detection apparatus comprising: a detection probe which is disposed in an inside or peripheral portion of the at least one of the single cells, and configured to detect an occurrence of a pinhole in the electrolyte membrane; and
a power generation controller configured to control power generation by the fuel cell stack,
wherein the operation control apparatus is also operatively connected to the pinhole detection apparatus and the power generation controller, and is configured to transfer signals for controlling the temperature adjustment apparatus and the power generation controller, and instruct the temperature adjustment apparatus to heat the electrolyte membrane when the pinhole detection apparatus determines that the pinhole exists in the electrolyte membrane.

4. The fuel cell system according to claim 3, wherein the detection probe is a thermocouple provided in the at least one of the single cells.

5. The fuel cell system according to claim 4, wherein the pinhole detection apparatus is configured to determine that, when a detected temperature of the at least one of the single cells, which is detected by the thermocouple, exceeds a predetermined temperature, the pinhole has occurred.

6. The fuel cell system according to claim 3, wherein the detection probe includes current/voltage detection terminals provided in the at least one of the single cells.

7. The fuel cell system according to claim 6, wherein the pinhole detection apparatus is configured to determine whether or not the pinhole exists based on a change of a current value, which is obtained by varying a voltage of the at least one of the single cells.

8. The fuel cell system according to claim 7, wherein the pinhole detection apparatus is configured to determine that, when a cross-leakage current value of the at least one of the single cells exceeds a predetermined value, the pinhole has occurred.

9. The fuel cell system according to claim 3, wherein the detection probe is a gas sampling port configured to sample gas flowing through the at least one of the single cells.

10. The fuel cell system according to claim 9, wherein the pinhole detection apparatus is configured to determine whether or not the pinhole exists based on a component of the gas sampled via the gas sampling port.

11. The fuel cell system according to claim 3, wherein the detection probe is an ion concentration detector configured to detect an amount of ions in drained water discharged from the fuel cell stack.

12. The fuel cell system according to claim 11, wherein the pinhole detection apparatus is configured to determine whether or not the pinhole exists based on a component and amount of eluted ions detected by the ion concentration detector.

13. The fuel cell system according to claim 1, wherein the electrolyte membrane comprises the gel electrolyte formed of: a three-dimensional mesh structure formed of a fiber-like aggregate with a nanometer size; and an electrolyte covered with the structure and composed of a cation component and an anion component, wherein the three-dimensional mesh structure has the sol-gel phase transition temperature.

14. The fuel cell system according to claim 13, wherein the electrolyte is a room-temperature molten salt composed of a molecular cation and a molecular anion.

15. The fuel cell system according to claim 1, wherein a plurality of the fuel cell stacks are provided.

16. A method of repairing an electrolyte membrane formed of a gel electrolyte having a sol-gel phase transition temperature in a fuel cell system comprising a fuel cell stack including single cells, each single cell comprising the electrolyte membrane, the method comprising:

operating the fuel cell stack;

while operating the fuel cell stack, predicting or detecting an occurrence of a pinhole in the electrolyte membrane of at least one of the single cells;

stopping an operation of the fuel cell stack when the occurrence of the pinhole is predicted or detected;

heating the electrolyte membrane and solating the gel electrolyte after the operation of the fuel cell stack is stopped; and dropping a temperature of the electrolyte membrane and gelating the gel electrolyte after the gel electrolyte is solated and the pinhole is repaired, wherein the gel electrolyte undergoes a reversible sol-gel phase change at the sol-gel phase transition temperature.

17. The method of repairing an electrolyte membrane according to claim 16, wherein:

the operation of the fuel cell stack is stopped when the occurrence of the pinhole is predicted, and the prediction of the occurrence of the pinhole is based on an operation history of the fuel cell stack.

18. The method of repairing an electrolyte membrane according to claim 16, wherein:

the operation of the fuel cell stack is stopped when the occurrence of the pinhole is detected, and the detection of the pinhole is performed by measuring the temperature of the at least one of the single cells, and determining the occurrence of the pinhole by comparing the measured temperature of the at least one of the single cells with a predetermined temperature.

19. The method of repairing an electrolyte membrane according to claim 16, wherein:

the operation of the fuel cell stack is stopped when the occurrence of the pinhole is detected, and the detection of the pinhole is performed by detecting a cross-leakage current value of the at least one of the single cells in a state in which the fuel cell stack is stopped, and determining the occurrence of the pinhole by comparing the detected cross-leakage current value with a predetermined threshold value.

20. The method of repairing an electrolyte membrane according to claim 16, wherein:

the operation of the fuel cell stack is stopped when the occurrence of the pinhole is detected, and the detection of the pinhole is performed by sampling gas flowing through the at least one of the single cells, detecting an amount of cross leakage in the at least one of the single cells based on the sampled gas, and determining the occurrence of the pinhole based on the detected amount of cross leakage.

21. The method of repairing an electrolyte membrane according to claim 16, wherein:

the operation of the fuel cell stack is stopped when the occurrence of the pinhole is detected, and the detection of the pinhole is performed by detecting an amount of ions in drained water discharged from the fuel cell stack, and determining the occurrence of the pinhole based on the detected amount of ions.

22. The method of repairing an electrolyte membrane according to claim 16, further comprising: issuing a notice on the occurrence of the pinhole when the occurrence of the pinhole is predicted or detected.

23. The method of repairing an electrolyte membrane according to claim 16, further comprising: resuming the fuel cell stack operation after gelating the gel electrolyte.

24. The method of repairing an electrolyte membrane according to claim 23, further comprising: investigating whether or not the pinhole is repaired before resuming the fuel cell stack operation.

25. A fuel cell system, comprising:

a fuel cell stack comprising a stack of a plurality of single cells, each single cell comprising:

a membrane electrode assembly in which electrode catalyst layers and gas diffusion layers are disposed on both surfaces of an electrolyte membrane formed of a gel electrolyte having a sol-gel phase transition temperature, and separators disposed on both sides of the membrane electrode assembly, wherein the gel electrolyte undergoes a reversible sol-gel phase change at the sol-gel phase transition temperature;

a temperature adjusting means for adjusting a temperature of the electrolyte membrane in the at least one of the single cells; and an operation controlling means operatively connected to the temperature adjusting means, the operation controlling means being configured to instruct the temperature adjusting means to heat the gel electrolyte of the at least one of the single cells to a temperature sufficient to change the gel electrolyte from a gel state to a sol state when an occurrence of a pinhole in the electrolyte membrane in the fuel cell stack is predicted or detected.

26. The fuel cell system according to claim 1, wherein the sol-gel phase transition temperature is within a range of 120° C. to 200° C.

27. The method of repairing an electrolyte membrane according to claim 16, wherein the sol-gel phase transition temperature is within a range of 120° C. to 200° C.

* * * * *